(12) United States Patent
Deferme

(10) Patent No.: US 11,635,122 B2
(45) Date of Patent: Apr. 25, 2023

(54) INTAKE DEVICE FOR A DAMPER HAVING A SIDE COLLECTOR

(71) Applicant: Tenneco Automotive Operating Company Inc., Lake Forest, IL (US)

(72) Inventor: Stefan Deferme, Heusden-Zolder (BE)

(73) Assignee: Tenneco Automotive Operating Company Inc., Northville, MI (US)

( * ) Notice: Subject to any disclaimer, the term of this patent is extended or adjusted under 35 U.S.C. 154(b) by 89 days.

(21) Appl. No.: 17/324,620

(22) Filed: May 19, 2021

(65) Prior Publication Data

US 2021/0270342 A1      Sep. 2, 2021

Related U.S. Application Data

(63) Continuation-in-part of application No. 16/515,219, filed on Jul. 18, 2019, now Pat. No. 11,248,677.

(51) Int. Cl.
  *F16F 9/43*      (2006.01)
  *F16F 9/32*      (2006.01)
  (Continued)

(52) U.S. Cl.
  CPC .............. *F16F 9/435* (2013.01); *F16F 9/062* (2013.01); *F16F 9/3271* (2013.01); *F16F 9/34* (2013.01); *F16F 2226/045* (2013.01)

(58) Field of Classification Search
  CPC .......... F16F 9/325; F16F 9/185; F16F 9/3214; F16F 9/3271; F16F 9/062; F16F 9/065;
  (Continued)

(56) References Cited

U.S. PATENT DOCUMENTS 2,320,697 A  *  6/1943  Binder ................. F16F 9/3484
                                                188/317
3,661,236 A       5/1972  Wossner
                          (Continued)

FOREIGN PATENT DOCUMENTS

CN       1656326 A      8/2005
CN     102574440 A      7/2012
             (Continued)

OTHER PUBLICATIONS

Chinese Office Action regarding Patent Application No. 2020800281047, dated Sep. 5, 2022.

(Continued)

*Primary Examiner* — Vishal R Sahni
(74) *Attorney, Agent, or Firm* — Harness, Dickey & Pierce, P.L.C.

(57) ABSTRACT

A damper with inner and outer tubes and a piston disposed within the inner tube to define first and second working chambers. A fluid transport chamber is positioned between the inner and outer tubes. A collector chamber is positioned outside the outer tube. An intake valve assembly, abutting one end of the inner tube, is positioned inside the outer tube to define a first intermediate chamber that is arranged in fluid communication with the collector chamber. The intake valve assembly includes a central passage that is arranged in fluid communication with the second working chamber and one or more intake valves that control fluid flow through the intake valve assembly between the first intermediate chamber and the central passage and between the first intermediate chamber and the fluid transport chamber.

21 Claims, 20 Drawing Sheets

(51) Int. Cl.
*F16F 9/34* (2006.01)
*F16F 9/06* (2006.01)

(58) Field of Classification Search
CPC ............ F16F 2222/12; F16F 2228/066; F16F 2226/048; B60G 13/08; B60G 2202/24; B60G 2206/8201
See application file for complete search history.

(56) References Cited

U.S. PATENT DOCUMENTS

| | | | |
|---|---|---|---|
| 4,802,561 A | 2/1989 | Knecht et al. | |
| 4,809,828 A * | 3/1989 | Nakazato | F16F 9/348 188/320 |
| 4,960,188 A * | 10/1990 | Wossner | F16F 9/36 188/315 |
| 5,010,916 A | 4/1991 | Albrecht | |
| 5,163,538 A | 11/1992 | Derr et al. | |
| 5,178,240 A | 1/1993 | Houghton | |
| 5,195,619 A | 3/1993 | Dourson et al. | |
| 5,301,412 A | 4/1994 | Hahn et al. | |
| 5,335,757 A | 8/1994 | Knecht et al. | |
| 5,375,683 A * | 12/1994 | Huang | F16F 9/46 188/266.8 |
| 5,431,259 A | 7/1995 | Mizutani et al. | |
| 5,540,309 A | 7/1996 | Huang et al. | |
| 5,558,189 A | 9/1996 | Beck | |
| 5,586,627 A | 12/1996 | Nezu et al. | |
| 5,588,510 A * | 12/1996 | Wilke | F16F 9/46 188/315 |
| 5,603,392 A | 2/1997 | Beck | |
| 5,607,035 A | 3/1997 | Fulks et al. | |
| 5,620,172 A | 4/1997 | Fulks et al. | |
| 5,649,611 A | 7/1997 | Nakadate | |
| 5,788,030 A | 8/1998 | Rottenberger | |
| 5,860,498 A | 1/1999 | Pradel | |
| 5,901,820 A | 5/1999 | Kashiwagi et al. | |
| 5,934,422 A | 8/1999 | Steed | |
| 6,116,584 A | 9/2000 | Romer | |
| 6,129,368 A | 10/2000 | Ishikawa | |
| 6,283,259 B1 | 9/2001 | Nakadate | |
| 6,321,888 B1 | 11/2001 | Reybrouck et al. | |
| 6,419,057 B1 | 7/2002 | Oliver et al. | |
| 6,427,986 B1 | 8/2002 | Sakai et al. | |
| 6,494,441 B2 | 12/2002 | Beck et al. | |
| 6,527,093 B2 | 3/2003 | Oliver et al. | |
| 6,978,871 B2 | 12/2005 | Holiviers | |
| 7,374,028 B2 * | 5/2008 | Fox | F16F 9/512 188/322.15 |
| 7,438,164 B2 | 10/2008 | Groves et al. | |
| 7,950,506 B2 * | 5/2011 | Nowaczyk | F16F 9/466 188/315 |
| 8,146,897 B2 | 4/2012 | Beck | |
| 8,157,276 B2 | 4/2012 | Noda et al. | |
| 8,495,947 B2 | 7/2013 | Hata | |
| 8,511,447 B2 | 8/2013 | Nowaczyk et al. | |
| 8,776,961 B2 | 7/2014 | Mori et al. | |
| 8,798,859 B2 | 8/2014 | Uchino et al. | |
| 8,898,899 B2 | 12/2014 | Kim | |
| 8,965,632 B2 | 2/2015 | Uchino et al. | |
| 9,062,737 B2 | 6/2015 | Hoult | |
| 9,067,636 B2 | 6/2015 | Murakami | |
| 9,080,631 B2 | 7/2015 | Hoult | |
| 9,169,888 B2 | 10/2015 | Nishimura et al. | |
| 9,206,876 B2 | 12/2015 | Yamashita et al. | |
| 9,309,948 B2 | 4/2016 | Katayama et al. | |
| 9,347,511 B2 | 5/2016 | Kim | |
| 9,428,030 B2 | 8/2016 | Teraoka et al. | |
| 9,662,952 B2 | 5/2017 | Funke et al. | |
| 10,400,847 B2 * | 9/2019 | Marking | F16F 9/3405 |
| 10,473,179 B2 | 11/2019 | Ripa | |
| 10,539,202 B2 | 1/2020 | Jee | |
| 10,570,982 B2 | 2/2020 | Zhu | |
| 2004/0262107 A1 | 12/2004 | Nandyal | |
| 2005/0023093 A1 | 2/2005 | Leiphart et al. | |
| 2005/0121268 A1 | 6/2005 | Groves et al. | |
| 2006/0054435 A1 * | 3/2006 | Yamaguchi | F16F 9/3485 188/322.19 |
| 2007/0000743 A1 * | 1/2007 | Naitou | B60G 15/12 188/322.2 |
| 2009/0223763 A1 * | 9/2009 | Lude | F16F 9/065 188/322.15 |
| 2009/0242339 A1 | 10/2009 | Nakadate et al. | |
| 2010/0065765 A1 | 3/2010 | Forche et al. | |
| 2010/0326780 A1 | 12/2010 | Murakami | |
| 2011/0042174 A1 | 2/2011 | Hamers et al. | |
| 2013/0081913 A1 | 4/2013 | Nowaczyk et al. | |
| 2013/0275003 A1 | 10/2013 | Uchino et al. | |
| 2014/0090938 A1 | 4/2014 | Nishimura | |
| 2014/0231200 A1 | 8/2014 | Katayama | |
| 2014/0291089 A1 | 10/2014 | Konakai et al. | |
| 2015/0047937 A1 | 2/2015 | Kim | |
| 2015/0191069 A1 | 7/2015 | Zuleger et al. | |
| 2016/0160955 A1 | 6/2016 | Yu et al. | |
| 2016/0214453 A1 | 7/2016 | Tanahashi et al. | |
| 2016/0229254 A1 | 8/2016 | Teraoka et al. | |
| 2016/0230832 A1 | 8/2016 | Hagidaira | |
| 2016/0281815 A1 * | 9/2016 | Teraoka | F16F 9/061 |
| 2016/0288605 A1 * | 10/2016 | Teraoka | B60G 13/08 |
| 2017/0284497 A1 | 10/2017 | Uotani et al. | |
| 2017/0334503 A1 | 11/2017 | Sintorn et al. | |
| 2018/0031071 A1 * | 2/2018 | Marking | F16F 9/065 |
| 2018/0031107 A1 | 2/2018 | Howard et al. | |
| 2018/0135720 A1 | 5/2018 | De Kock | |
| 2018/0266510 A1 * | 9/2018 | Jee | F16F 9/325 |
| 2018/0320751 A1 | 11/2018 | Kadokura et al. | |
| 2018/0355939 A1 * | 12/2018 | Zeissner | F16F 9/3271 |
| 2019/0136932 A1 * | 5/2019 | Deferme | B60G 17/0152 |
| 2019/0309816 A1 | 10/2019 | Shibata et al. | |
| 2020/0124129 A1 | 4/2020 | Mohammadi | |
| 2020/0208704 A1 * | 7/2020 | Deferme | F16F 9/062 |
| 2020/0208705 A1 * | 7/2020 | Deferme | F16F 9/366 |
| 2021/0003190 A1 | 1/2021 | Deferme | |
| 2021/0018058 A1 * | 1/2021 | Deferme | F16F 9/3214 |
| 2021/0270342 A1 * | 9/2021 | Deferme | F16F 9/065 |

FOREIGN PATENT DOCUMENTS

| | | | |
|---|---|---|---|
| CN | 204083040 U | 1/2015 | |
| DE | 4022099 C1 | 12/1991 | |
| DE | 19527849 C1 | 8/1996 | |
| DE | 4423515 C2 | 7/1998 | |
| DE | 4324444 C2 | 11/2000 | |
| DE | 10355151 A1 | 6/2005 | |
| DE | 102006014463 A1 | 8/2007 | |
| DE | 102010020057 A1 | 1/2011 | |
| DE | 102014220720 A1 * | 4/2016 | ............ F16F 9/3242 |
| DE | 102015209179 A1 | 11/2016 | |
| DE | 102015224811 A1 | 6/2017 | |
| DE | 102016206595 A1 | 10/2017 | |
| EP | 0635655 A1 | 1/1995 | |
| EP | 1508723 A2 | 2/2005 | |
| EP | 1862337 B1 | 8/2012 | |
| GB | 2262971 A * | 7/1993 | ............ F16F 9/062 |
| JP | 2005527757 A | 9/2005 | |
| JP | 2007024195 A * | 2/2007 | |
| JP | 2010-107040 A | 5/2010 | |
| JP | 2014-070703 A | 4/2014 | |
| JP | 2017146277 A | 8/2017 | |
| KR | 101756423 B1 | 7/2017 | |
| KR | 10-2018-0106202 A | 10/2018 | |
| WO | WO-2017182198 A1 | 10/2017 | |
| WO | WO-2020/139691 A1 | 7/2020 | |
| WO | WO-2021/003069 A1 | 1/2021 | |
| WO | WO-2021/011516 A1 | 1/2021 | |

OTHER PUBLICATIONS

International Search Report and Written Opinion for PCT/US2019/067464 dated Apr. 21, 2020; 10 pages.
International Search Report and Written Opinion for PCT/US2019/067439 dated Apr. 27, 2020; 6 pages.

(56) References Cited

OTHER PUBLICATIONS

International Search Report regarding PCT/US2020/039794, dated Oct. 8, 2020.
Written Opinion regarding PCT/US2020/039794, dated Oct. 8, 2020.
International Search Report regarding PCT/US2020/041887, dated Oct. 30, 2020.
Written Opinion regarding PCT/US2020/041887, dated Oct. 30, 2020.
Extended European Search Report regarding Patent Application No. 22169372.4 dated Dec. 12, 2022.

* cited by examiner

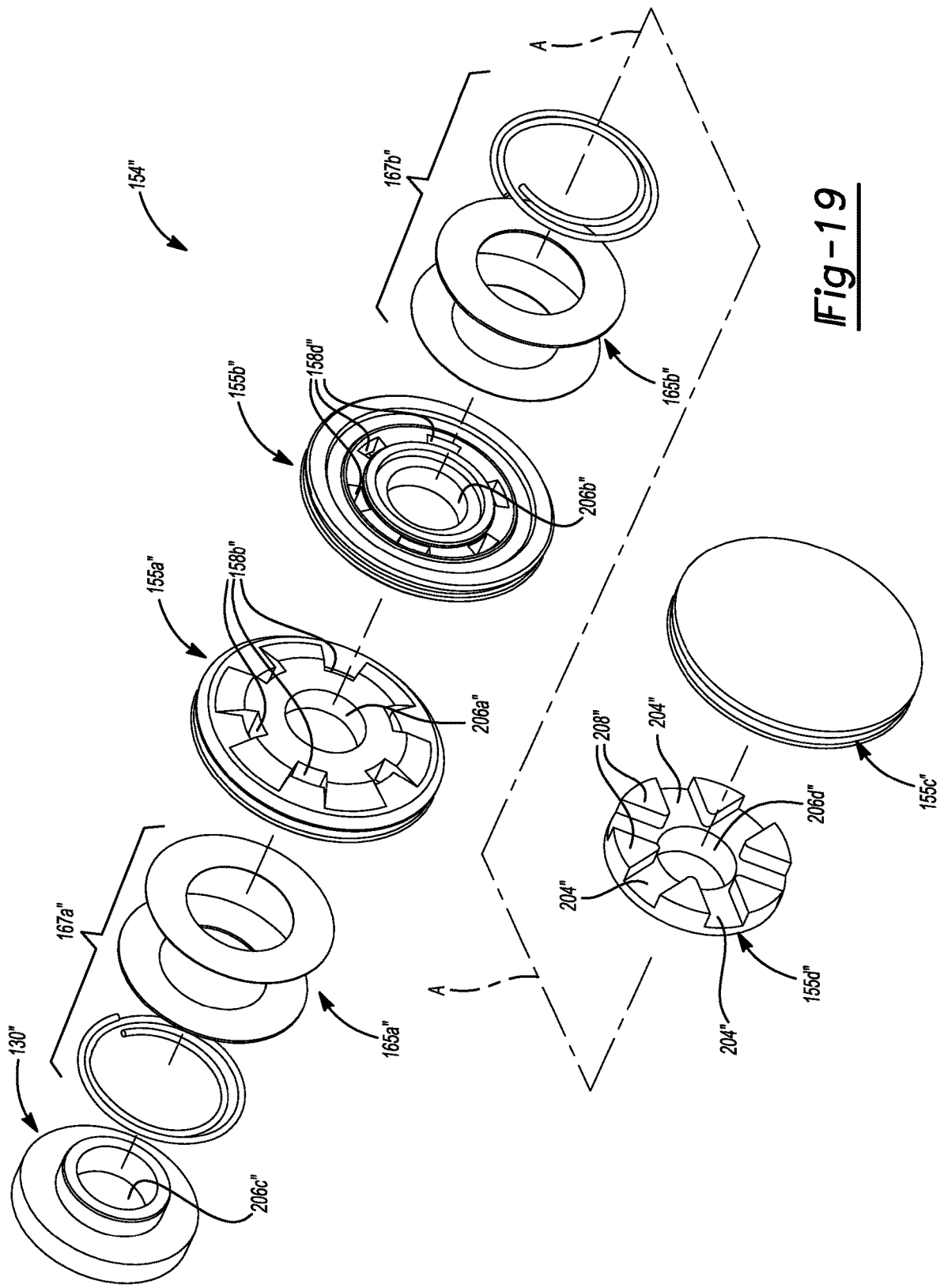

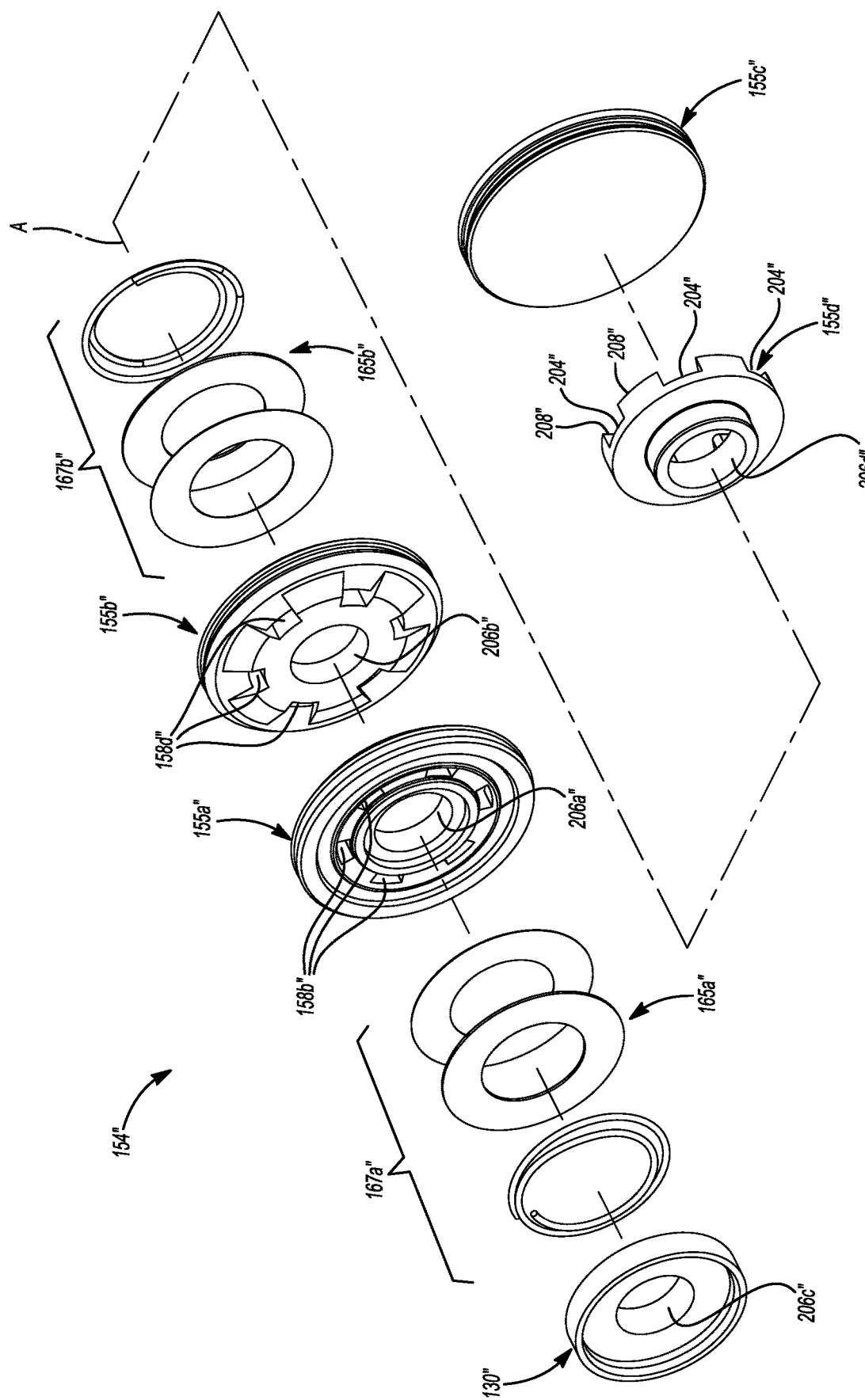

US 11,635,122 B2

INTAKE DEVICE FOR A DAMPER HAVING A SIDE COLLECTOR

CROSS-REFERENCE TO RELATED APPLICATIONS

This application is a continuation-in-part of U.S. patent application Ser. No. 16/515,219 filed on Jul. 18, 2019 and entitled "Pre-Assembled Piston Accumulator Insert Device." The entire disclosure of the above referenced application is expressly incorporated herein by reference.

FIELD

The present disclosure generally relates to dampers. More particularly, the present disclosure relates to a damper with multiple external control valves mounted to a side collector.

BACKGROUND

This section provides background information related to the present disclosure which is not necessarily prior art.

Vehicles generally include dampers that are used in conjunction with suspension systems to absorb vibrations that occur while driving the vehicle. In order to absorb the vibrations, dampers are generally connected between a body and the suspension system of the vehicle. A piston is located within the damper. The piston is connected to the vehicle body or the suspension of the vehicle through a piston rod. The damper also includes a damper body that is connected to the suspension system. As the damper is compressed or extended, the piston may limit the flow of damping fluid between first and second working chambers that are defined within the damper body in order to produce a damping force that counteracts the vibrations. By further restricting the flow of damping fluid between the first and second working chambers of the damper, greater damping forces may be generated by the damper.

Dampers typically include one or more valves that control the flow of fluid during extension and compression motions of the piston. Current damper designs include a valve block that provides mutual hydraulic connections between the first and second working chambers, the valves, and an accumulator. Such designs often make the damper bulky and increase the overall cost of the damper. Current dampers also have check valves that further increase the size and cost of the damper.

SUMMARY

This section provides a general summary of the disclosure, and is not a comprehensive disclosure of its full scope or all of its features.

In accordance with one aspect of the present disclosure, a damper is provided. The damper includes an inner tube that extends longitudinally between first and second inner tube ends. The damper includes a piston slidably disposed within the inner tube. The piston defines a first working chamber and a second working chamber within the inner tube. The first working chamber is longitudinally positioned between the piston and the first inner tube end and the second working chamber is longitudinally positioned between the piston and the second inner tube end. The damper also includes an outer tube disposed around the inner tube. The outer tube extends longitudinally between first and second outer tube ends. The first working chamber is arranged in fluid communication with a fluid transport chamber that is disposed radially between the inner tube and the outer tube. The damper further includes a cover member that is mounted to the outer tube to define a collector chamber, which is positioned outside of the outer tube.

The damper includes an intake valve assembly that is positioned within the outer tube to define a first intermediate chamber that is arranged in fluid communication with the collector chamber. The intake valve assembly includes a central passage that extends longitudinally through the intake valve assembly and that is arranged in fluid communication with the second working chamber. The intake valve assembly also includes one or more intake valves that control fluid flow through the intake valve assembly between the first intermediate chamber and the central passage and between the first intermediate chamber and the fluid transport chamber. For example, during compression strokes of the damper, at least one intake valve controls fluid flow through the intake valve assembly from the first intermediate chamber to the fluid transport chamber. During extension strokes of the damper, at least one intake valve controls fluid flow through the intake valve assembly from the first intermediate chamber to the second working chamber via the central passage.

In accordance with another aspect of the present disclosure, the damper includes first and second control valves that are externally mounted to the cover member on the outer tube and the intake valve assembly defines a first intermediate chamber and a second intermediate chamber inside the outer tube. The first control valve has a first control valve inlet that is arranged in fluid communication with the fluid transport chamber via a first control valve port in the outer tube and a first control valve outlet that is arranged in fluid communication with the collector chamber. The second control valve has a second control valve inlet that is arranged in fluid communication with the second intermediate chamber of the intake valve assembly via a second control valve port in the outer tube and a second control valve outlet that is arranged in fluid communication with the collector chamber. In accordance with this arrangement, the first control valve controls the dampening level during extension strokes and the second control valve controls the damping level during compression strokes.

The first and second control valve ports are circumferentially aligned with each other on the outer tube along a control valve port axis that runs parallel with a central longitudinal axis of the damper. The cover member abuts the outer tube along the control valve port axis such that the collector chamber runs on each side of the control valve port axis. The collector chamber is arranged in fluid communication with the first intermediate chamber via one or more open ports in the outer tube that are offset relative to the first and second control valve ports such that the one or more open ports are circumferentially spaced relative to the control valve port axis. In accordance with this arrangement, the overall packaging height of the first and second control valves is reduced by minimizing the height of the collector chamber in the area where the first and second control valves mate with the first and second control valve ports.

In accordance with another aspect of the present disclosure, a method of manufacturing the disclosed dampers is provided. The method includes the steps of inserting an accumulator insert and then inserting an intake valve assembly into the first outer tube end. The intake valve assembly is designed to be inserted in a sequentially ordered stack comprised of a toothed ring, a second spring-disc stack, a second intake valve body, a first intake valve body, a first spring-disc stack, and an adapter ring, in that order. In other words, the toothed ring is the first component of the intake valve assembly that is inserted into the first outer tube end and the adapter ring is the last component of the intake valve assembly that is inserted into the first outer tube end. The method continues with the step of inserting the inner tube into the first outer tube end and pressing the second inner tube end into contact with the adapter ring of the intake valve assembly such that the intake valve assembly is clamped between the accumulator insert and the second inner tube end. This eliminates the need for mechanically attaching the intake valve assembly to the outer tube, such as by welding. The method may also include creating a pre-assembled intake valve assembly by fitting the toothed ring, the second spring-disc stack, the second intake valve body, the first intake valve body, the first spring-disc stack, and the adapter ring onto a retainer sleeve before inserting the intake valve assembly into the first outer tube end. As a result, both the intake valve assembly and the accumulator insert can be preassembled and then be slid into the outer tube of the damper.

BRIEF DESCRIPTION OF DRAWINGS

The drawings described herein are for illustrative purposes only of selected embodiments and not all possible implementations, and are not intended to limit the scope of the present disclosure.

FIG. 19 is a rear exploded perspective view of the exemplary intake valve assembly of the exemplary damper shown in FIG. 13;

FIG. 20 is a front exploded perspective view of the exemplary intake valve assembly of the exemplary damper shown in FIG. 13;

DETAILED DESCRIPTION

Figure 1:
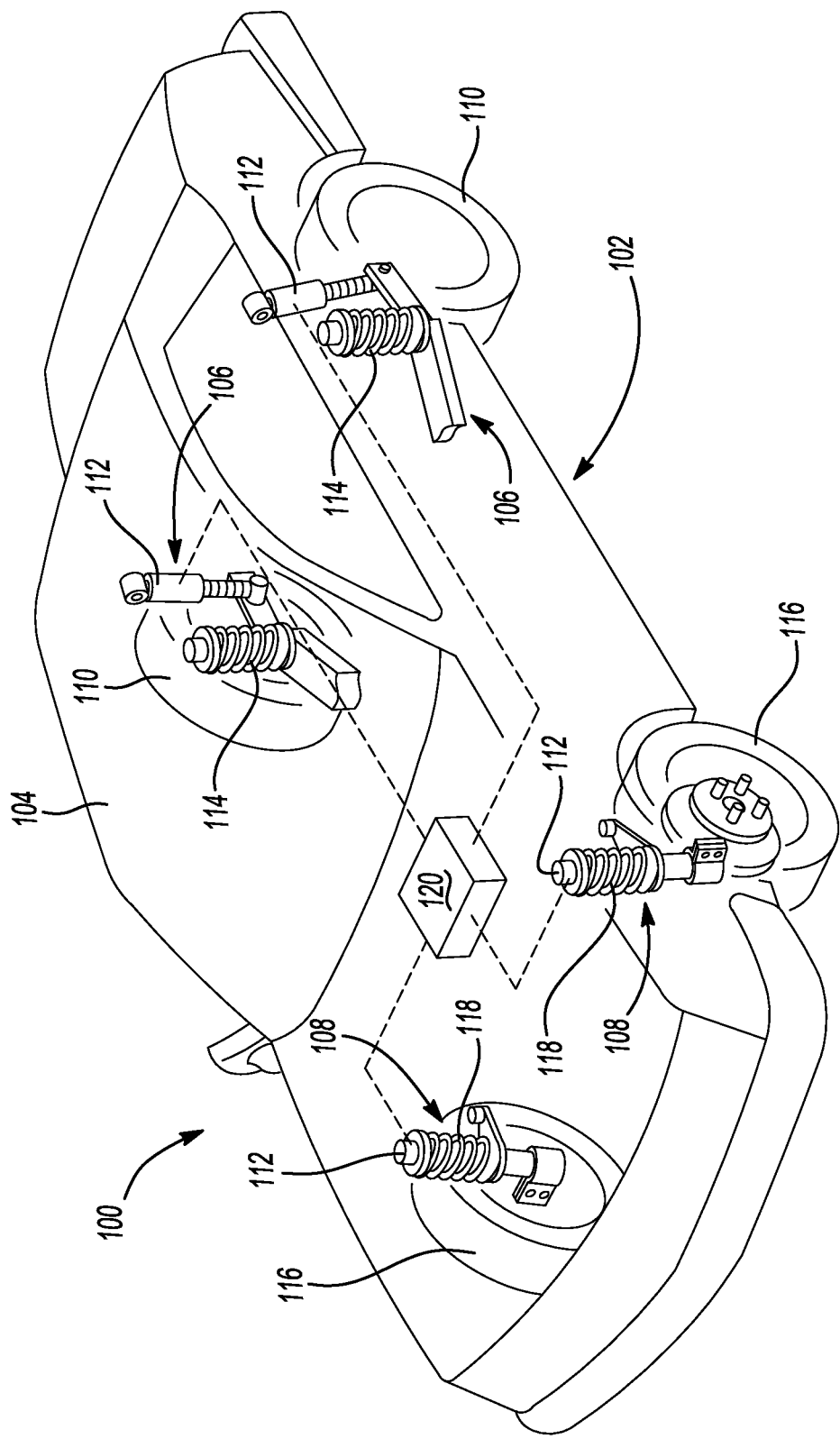
FIG. 1 is an illustration of a vehicle incorporating a suspension system constructed in accordance with the present disclosure.

Example embodiments will now be described more fully with reference to the accompanying drawings. Wherever possible, the same reference numbers will be used throughout the drawings to refer to same or like parts.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 illustrates an exemplary vehicle 100 incorporating a suspension system 102 in accordance with the present disclosure. The vehicle 100 may be driven by an internal combustion engine, an electric motor, a hybrid/electric powertrain, or equivalents thereof. The vehicle 100 includes a body 104. The suspension system 102 of the vehicle 100 includes a rear suspension 106 and a front suspension 108. The rear suspension 106 includes a transversely extending rear axle assembly (not shown) adapted to operatively support a pair of rear wheels 110. The rear axle assembly is operatively connected to the body 104 by means of a pair of dampers 112 and a pair of helical coil springs 114. Similarly, the front suspension 108 includes a transversely extending front axle assembly (not shown) that supports a pair of front wheels 116. The front axle assembly is connected to the body 104 by means of another pair of dampers 112 and a pair of helical coil springs 118. In an alternative embodiment, the vehicle 100 may include an independent suspension unit (not shown) for each of the four corners instead of the front and rear axle assemblies.

The dampers 112 of the suspension system 102 serve to dampen the relative movement of the unsprung portion (i.e., the front and rear suspensions 108, 106 and the front and rear wheels 116, 110) and the sprung portion (i.e., the body 104) of the vehicle 100. While the vehicle 100 has been depicted as a passenger car, the dampers 112 may be used with other types of vehicles. Examples of such vehicles include buses, trucks, off-road vehicles, three-wheelers, ATVs, motor bikes, and so forth. Furthermore, the term "damper" as used herein will refer to dampers in general and will include shock absorbers, McPherson struts, and semi-active and active suspensions.

In order to automatically adjust each of the dampers 112, an electronic controller 120 is electrically connected to the dampers 112. The electronic controller 120 is used for controlling the operation of each of the dampers 112 in order to provide appropriate damping characteristics resulting from movements of the body 104 of the vehicle 100. The electronic controller 120 may independently control each of the dampers 112 in order to independently control a damping level of each of the dampers 112. The electronic controller 120 may be electrically connected to the dampers 112 via wired connections, wireless connections, or a combination thereof.

The electronic controller 120 may independently adjust the damping level, damping rate, or damping characteristics of each of the dampers 112 to optimize the ride performance of the vehicle 100. The term "damping level", as used herein, refers to a damping force produced by each of the dampers 112 to counteract movements or vibrations of the body 104. A higher damping level may correspond to a higher damping force. Similarly, a lower damping level may correspond to a lower damping force. Adjustment of the damping levels is beneficial during braking and turning of the vehicle 100 to counteract brake dive, during braking, and body roll during turns. In accordance with one embodiment of the present disclosure, the electronic controller 120 processes input signals from one or more sensors (not shown) of the vehicle 100 in order to control the damping level of each of the dampers 112. The sensors may sense one or more parameters of the vehicle 100, such as, but not limited to, displacement, velocity, acceleration, vehicle speed, steering wheel angle, brake pressure, engine torque, engine revolutions per minute (RPM), throttle pedal position, and so forth. The electronic controller 120 may further control the damping level of the dampers 112 based on a driving mode of the vehicle 100. The driving mode may include a sport mode and a comfort mode. A button (not shown) may allow a driver of the vehicle 100 to choose the driving mode of the vehicle 100. The electronic controller 120 may receive input signals based on an actuation of the button and control the dampers 112 accordingly.

In accordance with another embodiment of the present disclosure, the electronic controller 120 controls the damping level of each of the dampers 112 based on external road conditions, such as rain, snow, mud, and the like. In a further embodiment, the electronic controller 120 regulates the damping level of each of the dampers 112 based on internal vehicle conditions, such as a fuel level, occupancy of the vehicle, load, and so forth.

While the present disclosure is being illustrated with a single electronic controller 120, it is within the scope of the present disclosure to utilize a dedicated electronic controller for each of the dampers 112. The dedicated electronic controller may be located onboard each respective damper 112. Alternatively, the electronic controller 120 may be integrated into an Electronic Control Unit (ECU) of the vehicle 100. The electronic controller 120 may include a processor, memory, Input/Output (I/O) interfaces, communication interfaces, and other electrical components. The processor may execute various instructions stored in the memory for carrying out various operations of the electronic controller 120. The electronic controller 120 may receive and transmit signals and data through the 1/O interfaces and the communication interfaces. In further embodiments, the electronic controller 120 may include microcontrollers, application-specific integrated circuits (ASICs), field programmable gate arrays (FPGAs), and so forth.

Figure 2:
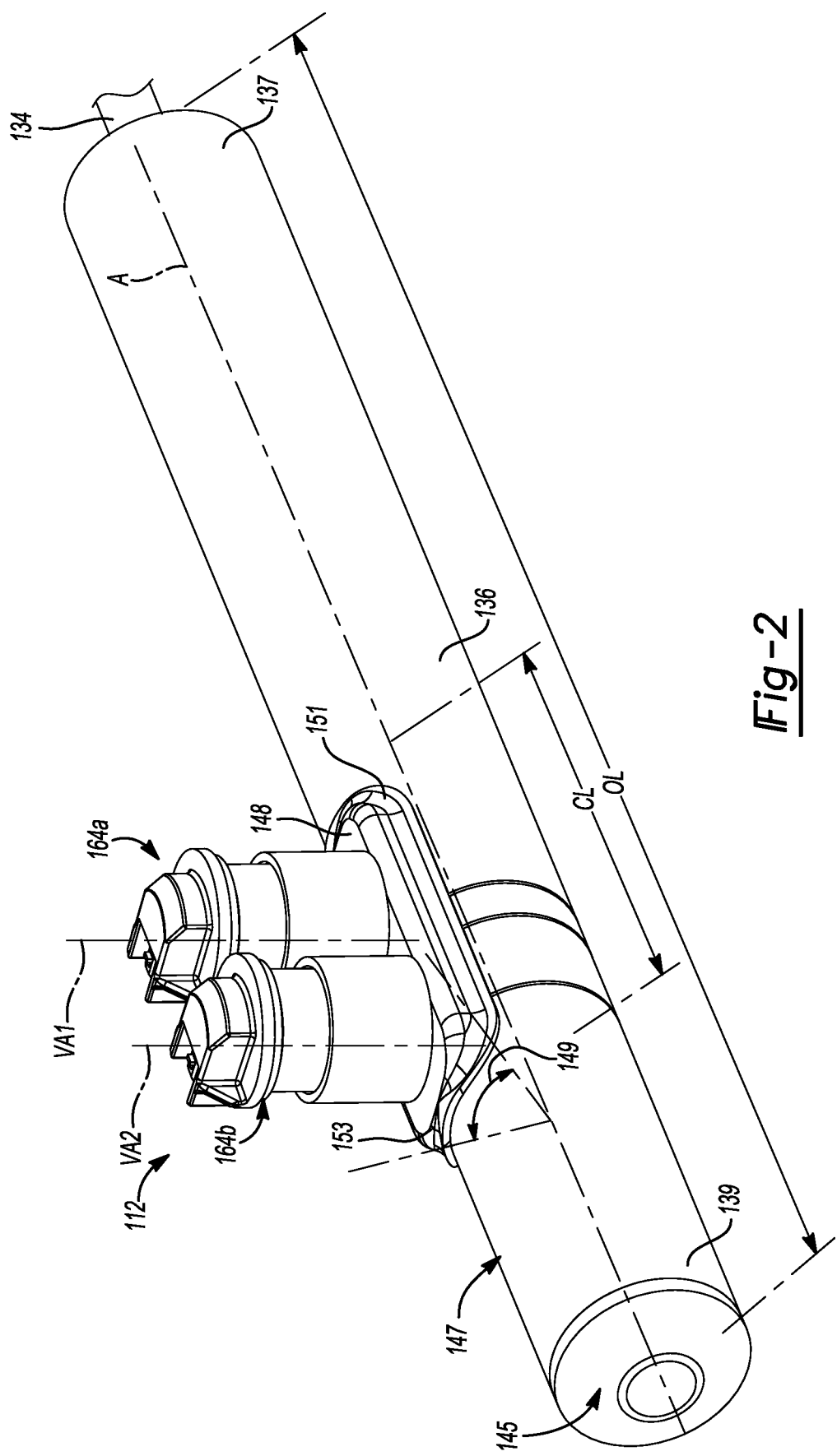
FIG. 2 is a front perspective view of an exemplary damper constructed in accordance with the present disclosure.
Figure 3:
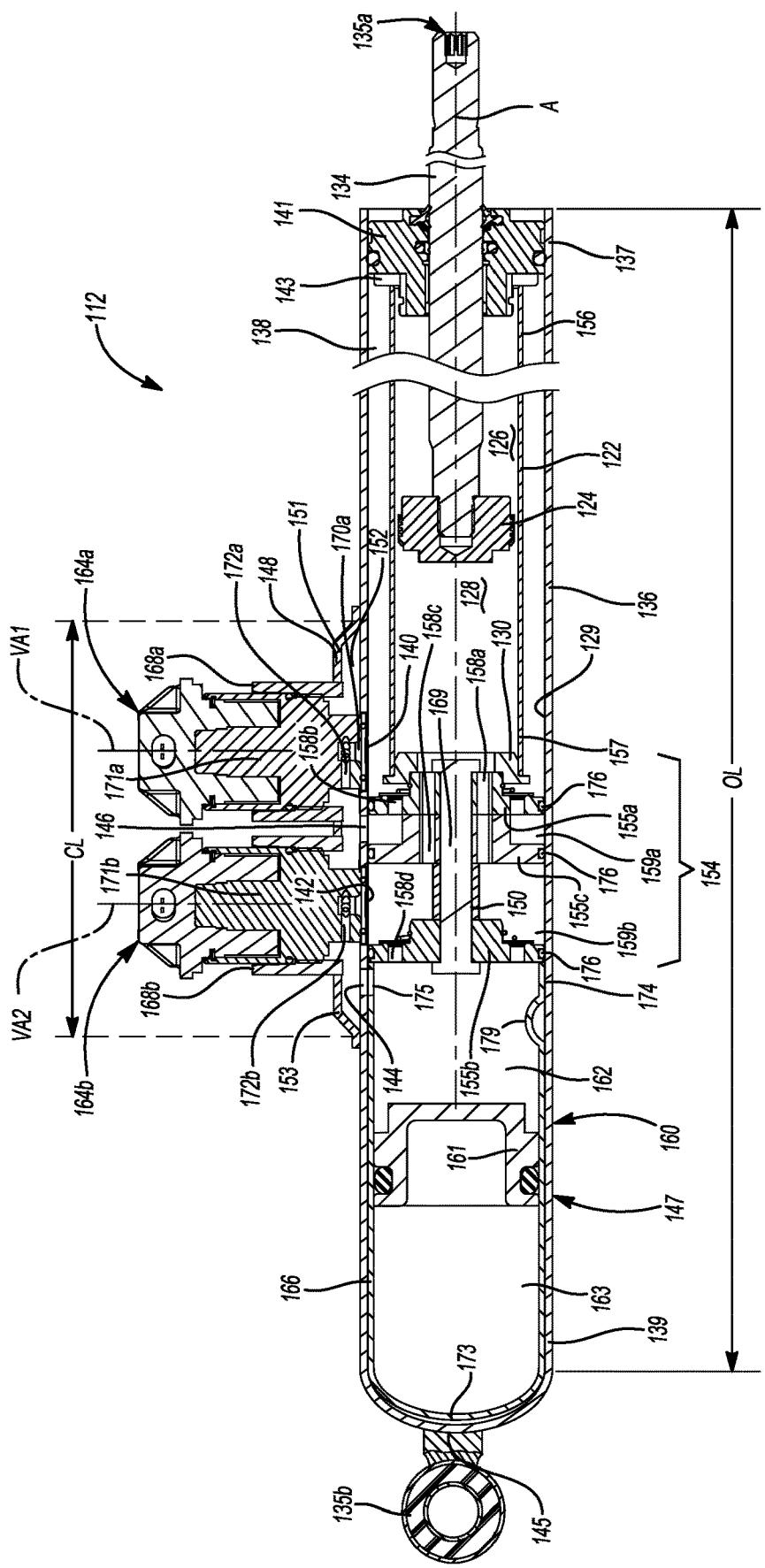
FIG. 3 is a side cross-sectional view of the exemplary damper shown in FIG. 2.

FIGS. 2 and 3 illustrate an exemplary damper 112. The damper 112 may be any of the four dampers 112 of the vehicle 100. The damper 112 may optionally be configured as a Continuously Variable Semi-Active Suspension system damper 112. The damper 112 contains a fluid. By way of example and without limitation, the fluid is hydraulic fluid or oil. The damper 112 includes an inner tube 122 that extends longitudinally between a first inner tube end 156 and a second inner tube end 157. A piston 124 is slidably disposed within the inner tube 122. The piston 124 defines a first working chamber 126 and a second working chamber 128 within the inner tube 122. Each of the first and second working chambers 126, 128 contain the fluid therein. The first working chamber 126 is positioned longitudinally between the piston 124 and the first inner tube end 156 and acts as a rebound chamber during movement of the piston 124. The second working chamber 128 is positioned longitudinally between the piston 124 and the second inner tube end 157 and acts as a compression chamber. The volume of the first and second working chambers 126, 128 varies based on the movement of the piston 124. The piston 124 seals against the inside of the inner tube 122.

In the illustrated example, the piston 124 is free of orifices or passages such that there is no fluid flow through the piston 124. In other words, fluid in the first working chamber 126 cannot pass through the piston 124 into the second working chamber 128 or vice versa. However, alternative configurations are possible where the piston 124 includes valving (not shown) to limit high internal pressures within the first and second working chambers 126, 128.

The damper 112 includes a piston rod 134. The piston rod 134 is coaxially aligned with and defines a longitudinal axis A. One end of the piston rod 134 is connected to the piston 124 and reciprocates with the piston 124 whereas an opposite end of the piston rod 134 includes an attachment fitting 135*a* that is configured to be connected to a component of the suspension system 102 or the body 104 of the vehicle 100.

The damper 112 also includes an outer tube 136 disposed annularly around the inner tube 122 and includes an inner cylindrical surface 129 that faces and is spaced from the inner tube 122. In some embodiments, the outer tube 136 is concentrically disposed around the inner tube 122. The outer tube 136 extends longitudinally between a first outer tube end 137 and a second outer tube end 139. The piston rod 134 extends longitudinally out through the first outer tube end 137. The outer tube 136 includes a closed portion 145 at the second outer tube end 139 and a cylindrical portion 147 that extends from the first outer tube end 137 to the closed portion 145 at the second outer tube end 139. Optionally, an attachment fitting 135*b* is mounted to the closed portion 145 of the outer tube 136. The attachment fitting 135*b* is provided in the form of a hole, loop, threaded stud, or other attachment structure and is configured to attach to a component of the suspension system 102 or the body 104 of the vehicle 100.

The damper 112 further includes a fluid transport chamber 138 that is disposed between the inner tube 122 and the outer tube 136. The piston rod 134 extends longitudinally through a rod guide 141, which is housed inside the first outer tube end 137. In the illustrated embodiment, the entire rod guide 141 is received within the first outer tube end 137 while only a portion of the rod guide 141 is received within the first inner tube end 156. The rod guide 141 includes a rod guide passage 143 that is arranged in fluid communication with and that extends between the first working chamber 126 and the fluid transport chamber 138. Stated another way, the fluid transport chamber 138 is arranged in fluid communication with the first working chamber 126 via the rod guide passage 143.

Further, the damper 112 includes a cover member 148 attached to the outer tube 136. A collector chamber 152 is defined between the cover member 148 and the outer tube 136. The collector chamber 152 is positioned external to (i.e., radially outward of) the outer tube 136.

In the illustrated example, the collector chamber 152 has a limited circumferential extent that extends about the outer tube in an arc 149 that is less than or equal to 180 degrees. In other words, the collector chamber 152 in the illustrated example is a pocket that runs along one side of the outer tube 136 and is therefore distinguishable from an annular chamber, such as an annular chamber created by another tube disposed about the outer tube 136. The outer tube 136 has an outer tube length OL that is measured longitudinally between the first and second outer tube ends 137, 139 and the collector chamber 152 has a collector chamber length CL that is measured longitudinally between first and second collector ends 151, 153. The collector chamber length CL is shorter than the outer tube length OL. In other words, the collector chamber 152 is shorter than the outer tube 136 and does not run along the entire length of the outer tube 136. Four ports 140, 142, 144, 146 extend through the outer tube 136 at longitudinally spaced locations that are aligned with the collector chamber 152 (i.e., that are positioned within the collector chamber length CL).

The damper 112 also includes an intake valve assembly 154 with an adapter ring 130 that is press-fit into the second inner tube end 157. The adapter ring 130 can be made in different variations with different outer diameters such that a standardized intake valve assembly 154 can be fitted in dampers with inner tubes 122 of different diameters. The intake valve assembly 154 is disposed inside the outer tube 136 and includes a first intake valve body 155*a* that abuts the adapter ring 130, a second valve body 155*b* that is longitudinally spaced from the first intake valve body 155*a*, and a divider body 155*c* that is positioned longitudinally between the first and second intake valve bodies 155*a*, 155*b*. The intake valve assembly 154 also includes a spacer 150 that is positioned longitudinally between the second intake valve body 155*b* and the divider body 155*c*.

The first and second intake valve bodies 155*a*, 155*b* and the divider body 155*c* abut the inner cylindrical surface 129 of the outer tube 136 to define first and second intermediate chambers 159*a*, 159*b* inside the outer tube 136. The first intermediate chamber 159*a* is positioned longitudinally between the first intake valve body 155*a* and the divider body 155*c*. The second intermediate chamber 159*b* is positioned longitudinally between the second intake valve body 155*b* and the divider body 155*c*. An accumulation chamber 162 is positioned longitudinally between the second intake valve body 155b and the second outer tube end 139. The first intake valve body 155a forms a partition between the first intermediate chamber 159a and the fluid transport chamber 138, the second intake valve body 155b forms a partition between the second intermediate chamber 159b and the accumulation chamber 162, and the divider body 155c forms a partition between the first and second intermediate chambers 159a, 159b.

Although other configurations may be possible, in the illustrated example, each of the first and second intake valve bodies 155a, 155b and the divider body 155c has a cylindrical hub portion and a disc-like flange such that the first and second intake valve bodies 155a, 155b and the divider body 155c have shapes similar to that of a top hat. The first and second intake valve bodies 155a, 155b and the divider body 155c can be pre-assembled prior to insertion into the damper 112 by a fastener 169 such as a bolt or a rivet that clamps the first and second intake valve bodies 155a, 155b and the divider body 155c together.

Figure 6:
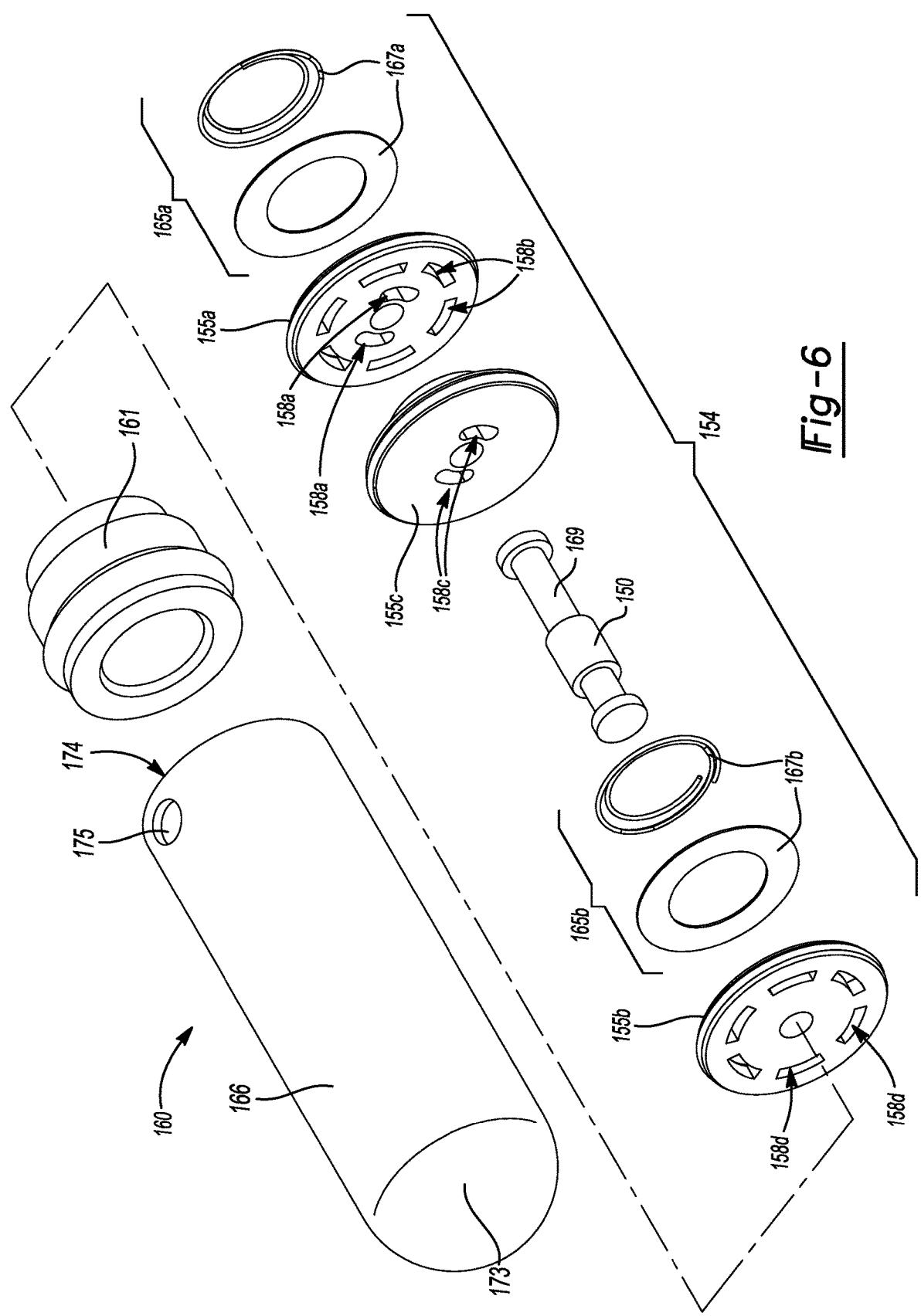
FIG. 6 is a front exploded perspective view of an exemplary intake valve assembly and accumulator insert of the exemplary damper shown in FIG. 3.
Figure 7:
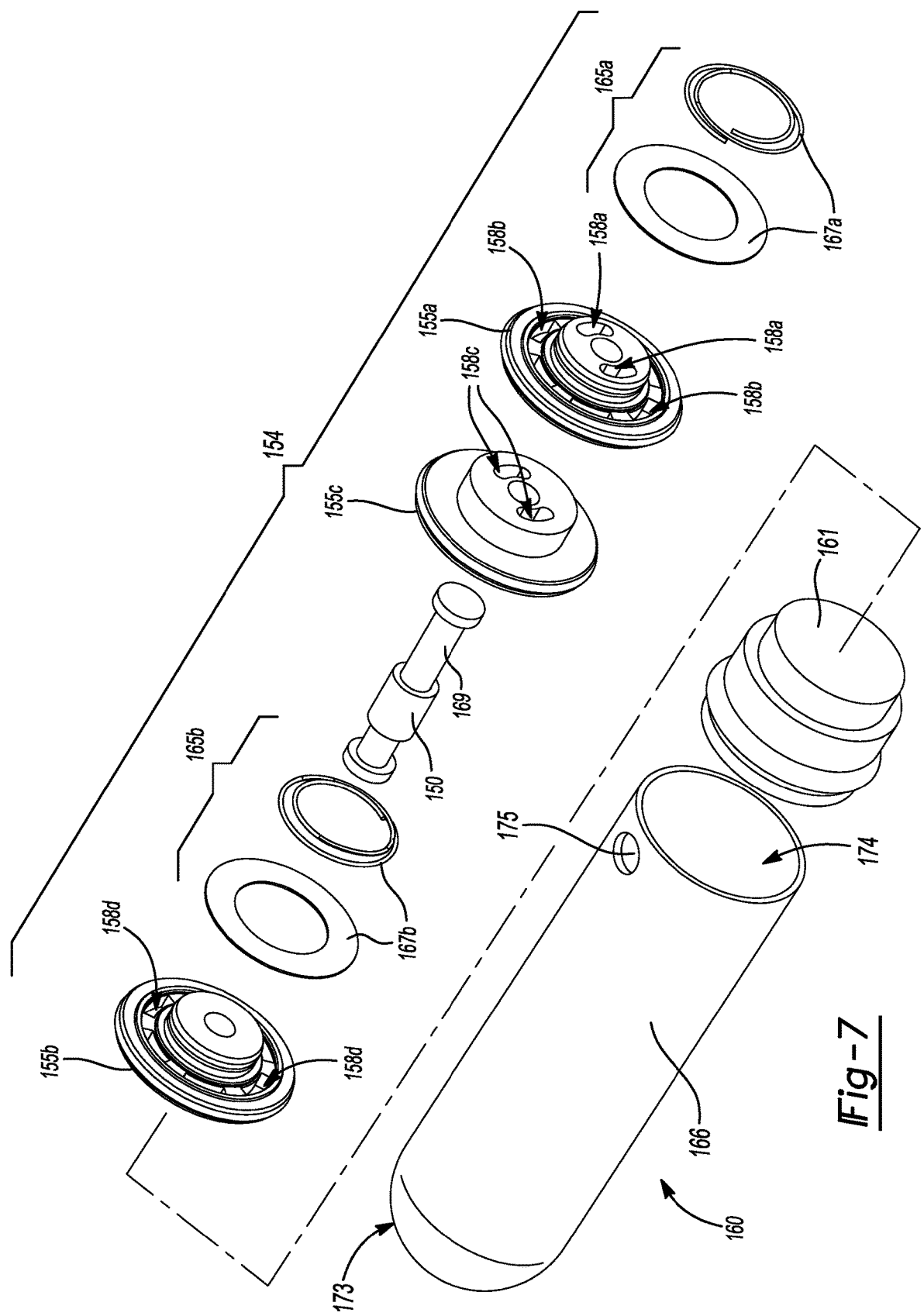
FIG. 7 is a rear exploded perspective view of the exemplary intake valve assembly and accumulator insert of the exemplary damper shown in FIG. 3.

The first intermediate chamber 159a and the accumulation chamber 162 are each arranged in fluid communication with the collector chamber 152 via ports 144, 146 in the outer tube 136. With additional reference to FIGS. 6 and 7, the first intake valve body 155a includes a first set of passages 158a and a first set of intake orifices 158b that extend through the first intake valve body 155a. The first set of intake orifices 158b are arranged circumferentially around (i.e., are radially outward of) the first set of passages 158a. The divider body 155c includes a second set of passages 158c. The first set of passages 158a in the first intake valve body 155a are aligned with and arranged in fluid communication with the second set of passages 158c in the divider body 155c. As a result, fluid can flow between the second intermediate chamber 159b and the second working chamber 128 via the first and second set of passages 158a, 158c. The second intake valve body 155b includes a second set of intake orifices 158d that extend through the second intake valve body 155b.

The first set of intake orifices 158b allow fluid communication between the first intermediate chamber 159a and the fluid transport chamber 138. The intake valve assembly 154 further comprises a first intake valve 165a that controls fluid flow through the first set of intake orifices 158b between the first intermediate chamber 159a and the fluid transport chamber 138. In the illustrated example, the first intake valve 165a is a passive valve. More specifically, in the illustrated embodiment, the first intake valve 165a includes a first spring disc stack 167a that is mounted to the first intake valve body 155a. In operation, the first spring disc stack 167a opens and closes the first intake orifices 158b by flexing towards and away from the first intake valve body 155a based on a pressure differential between the first intermediate chamber 159a and the fluid transport chamber 138. The first intake valve 165a acts as a one-way valve that permits fluid flow in only one direction from the first intermediate chamber 159a to the fluid transport chamber 138. As will be explained in greater detail below, this one-way flow through the first intake valve 165a occurs during compression strokes, which is where the piston 124 moves toward the intake valve assembly 154.

The second set of intake orifices 158d allow fluid communication between the accumulation chamber 162 and the second intermediate chamber 159b. The intake valve assembly 154 further comprises a second intake valve 165b that controls fluid flow through the second set of intake orifices 158d between the accumulation chamber 162 and the second intermediate chamber 159b. In the illustrated example, the second intake valve 165b is a passive valve. More specifically, in the illustrated embodiment, the second intake valve 165b includes a second spring disc stack 167b that is mounted to the second intake valve body 155b. In operation, the second spring disc stack 167b opens and closes the second set of intake orifices 158d by flexing towards and away from the second intake valve body 155b based on a pressure differential between the accumulation chamber 162 and the second intermediate chamber 159b. The second intake valve 165b acts as a one-way valve that permits fluid flow in only one direction from the accumulation chamber 162 and the second intermediate chamber 159b. As will be explained in greater detail below, this one-way flow through the second intake valve 165b occurs during extension strokes, which is where the piston 124 moves away from the intake valve assembly 154. Optionally, the intake valve assembly 154 may have one or more permanent bleed passages. For example, the intake valve assembly 154 may include extra slotted discs (not shown) between the first and second spring disc stacks 167a, 167b and the first and second intake valve bodies 155a, 155b. Alternatively, small indents (not shown) can be provided in the sealing land of the first and second intake valve bodies 155a, 155b.

In accordance with the illustrated embodiment, the damper 112 includes an accumulator insert 160 that is disposed within the second outer tube end 139. The accumulator insert 160 includes an accumulator sleeve 166, a floating piston 161, and a pressurized chamber (e.g., a gas chamber) 163. The accumulator sleeve 166 is positioned inside the outer tube 136 and extends between a closed end 173 adjacent to the second outer tube end 139 and an open end 174 adjacent to the intake valve assembly 154. The floating piston 161 is preassembled inside the accumulator sleeve 166 in a sliding fit. The pressurized chamber 163 is sealably separated from the accumulation chamber 162 by the floating piston 161. Therefore, the accumulation chamber 162 is positioned longitudinally between the intake valve assembly 154 and the floating piston 161 and at least part of the accumulation chamber 162 is disposed inside the accumulator sleeve 166. The accumulator chamber 162 contains a fluid and is arranged in fluid communication with the collector chamber 152 via a third port (i.e., an accumulator port) 144 in the outer tube and an aperture 175 in the accumulator sleeve 166 that is arranged in fluid communication with the third port/accumulator port 144 (i.e., the aperture 175 in the accumulator sleeve 166 is aligned with the third port/accumulator port 144 in the outer tube 136). It should be appreciated that the term aperture, as used herein, is meant to include holes, orifices, passageways, slots, cut-outs, or other structures capable of communicating fluid between the accumulation chamber 162 and the collector chamber 152. The pressurized chamber 163 is positioned longitudinally between the floating piston 161 and the closed end 173. The pressurized chamber 163 contains a pressurized fluid, such as a gas, that operates to bias the floating piston 161 towards the intake valve assembly 154.

The accumulator sleeve 166 extends longitudinally between the second outer tube end 139 and the intake valve assembly 154 such that the closed end 173 of the accumulator sleeve 166 abuts (i.e., contacts) the closed portion 145 of the second outer tube end 139 and such that the open end 174 of the accumulator sleeve 166 abuts the second intake valve body 155b of the intake valve assembly 154. Optionally, the closed end 173 of the accumulator sleeve 166 may be configured to have a shallower curvature than the closed portion 145 of the second outer tube end 139 to create a ring-shaped contact area between the closed end 173 of the accumulator sleeve 166 and the closed portion 145 of the second outer tube end 139. This ring-shaped contact area functions to help center the accumulator insert 160 within the second outer tube end 139, provides greater load bearing surface area to support a preload force over a point contact, and helps prevent rotation between the accumulator sleeve 166 and the outer tube 136 by increasing friction over a point contact.

The accumulator sleeve 166 is arranged in a slip fit within the outer tube 136 and applies a preload on the intake valve assembly 154 such that the intake valve assembly 154 is clamped between the open end 174 of the accumulator sleeve 166 and the second inner tube end 157 of inner tube 122. This pre-load also prevents the accumulator sleeve 166 from rotating relative to the outer tube 136 such that the alignment of the aperture 175 in the accumulator sleeve 166 and the third port/accumulator port 144 in the outer tube 136 is maintained after assembly. In accordance with this arrangement, the first and second intake valve bodies 155a, 155b and the divider body 155c do not need to be mechanically attached to the outer tube 136 (such as by welding) because the intake valve assembly 154 is held in place by the accumulator sleeve 166 and the inner tube 122. Instead, O-ring seals 176, positioned on the first and second intake valve bodies 155a, 155b and the divider body 155c, are arranged in sealing contact with the inner cylindrical surface 129 of the outer tube 136.

In accordance with this embodiment, manufacturing and assembly of the damper 112 is less complicated, more efficient, and more economical. Both the intake valve assembly 154 and the accumulator insert 160 can be pre-assembled prior to installation inside the outer tube 136. By way of example and without limitation, the pressurized chamber 163 can be charged with a pressurized gas at a pressure of 3 to 8 Bar while the floating piston 161 is inserted into the open end 174 of the accumulator sleeve 166. An indent 179 can then be applied to the accumulator sleeve 166 to prevent the pressurized gas in the pressurized chamber 163 from pushing the floating piston 161 out through the open end 174 in the accumulator sleeve 166. The entire pre-assembled accumulator insert 160 can then be inserted into the outer tube 136. Next, the entire pre-assembled intake valve assembly 154 can be inserted into the outer tube 136. Finally, the inner tube 122 can be inserted into the outer tube 136 until the second inner tube end 157 contacts the adapter ring 130 of the intake valve assembly 154, the piston 124 and piston rod 134 can be inserted in the inner tube 122, and then the rod guide 141 can be pressed into the first inner tube end 156 and the first outer tube end 137 at a preload. By way of example and without limitation, a preload force of approximately 10 kilonewtons (kN) can be used. All of these steps can be done without any welding operations.

For example, an exemplary method of manufacturing the damper 112 is set forth below. The method beings with the steps of: forming the outer tube 136 with a first outer tube end 137 that is open and a second outer tube end 139 that has a closed portion 145, forming the inner tube 122 with a first inner tube end 156 and a second inner tube end 157, and creating the pre-assembled intake valve assembly 154. The step of creating the pre-assembled intake valve assembly 154 includes fastening the first and second intake valve bodies 155a, 155b to the divider body 155c, which may be done using a bolt, rivet, or other fastener. The method further includes the steps of: forming the accumulator sleeve 166 with a closed end 173 and an open end 174, filling the accumulator sleeve 166 with a pressurized gas, and inserting a floating piston 161 into the open end 174 of the accumulator sleeve 166 to create the pre-assembled accumulator insert 160. The method may also include the steps of: forming the accumulator port 144 in the outer tube 136 and the collector chamber 152 (which is arranged in fluid communication with the accumulator port 144), forming the aperture 175 in the accumulator sleeve 166 (which is arranged in fluid communication with the accumulator port 144 by aligning the aperture 175 with the accumulator port 144), and forming an indent 179 in the accumulator sleeve 166 after the step of inserting the floating piston 161 into the open end 174 of the accumulator sleeve 166 to prevent the pressurized gas in the pressurized chamber 163 from pushing the floating piston 161 back out through the open end 174 of the accumulator sleeve 166.

The method then proceeds with the steps of: inserting the pre-assembled accumulator insert 160 into the first outer tube end 137, inserting the pre-assembled intake valve assembly 154 into the first outer tube end 137, and inserting the inner tube 122 into the first outer tube end 137. The piston 124 and piston rod 134 are inserted in the inner tube 122 and the rod guide 141 is pressed into the first inner tube end 156 and the first outer tube end 137 at a pre-determined preload, which presses the second inner tube end 157 into contact with the adapter ring 130 of the intake valve assembly 154, the pre-assembled intake valve assembly 154 into contact with the open end 174 of the accumulator sleeve 166, and the closed end 173 of the accumulator sleeve 166 into contact with the closed portion 145 of the second outer tube end 139. In accordance with this method, all welding, heat treating, and painting operations on the outer tube 136 are completed before the steps of inserting the pre-assembled intake valve assembly 154 and the pre-assembled accumulator insert 160 into the outer tube 136.

There are a number of advantages associated with the present design. First, filling the pressurized chamber 163 with a pressurized gas while the accumulator insert 160 is outside of the damper 112 is easier than filling the second outer tube end 139 with a pressurized gas, which typically requires a separate filling port or welded end cap on the second outer tube end 139. Second, by moving the floating piston 161 to an accumulator insert sub-assembly 160, the present design also makes it easier to coat the outer tube 136 with paint/coatings that require high temperature curing because typical seals used on the floating piston 161 cannot withstand high temperatures. Third, attachments such as the attachment fitting 135b and the cover member 148 can be welded to the outer tube 136 without affecting the sealing surface for the floating piston 161 because the floating piston 161 slides against the inside surface of the accumulator sleeve 166 instead of the inner cylindrical surface 129 of the outer tube 136. The heat generated by welding operations can cause distortion and create variances (i.e., change) in part geometries, which can negatively affect the operation and sealing of the floating piston 161. The disclosed design resolves this problem because no welding operations are required on the accumulator sleeve along the travel path of the floating piston 161 and all welding operations on the outer tube 136 are completed before the accumulator insert 160 is inserted into the outer tube 136.

The damper 112 includes first and second control valves 164a, 164b that are externally mounted to the outer tube 136. In the illustrated example, the first and second control valves 164a, 164b are two-position, solenoid actuated electro-hydraulic valves. However, it should be appreciated that other types of active (e.g., electric) or passive (e.g., mechanical) externally mounted valves can be used. As will be explained in greater detail below, the first control valve 164a is operable to regulate fluid flow from the fluid transport chamber 138 to the collector chamber 152 and the second control valve 164b is operable to regulate fluid flow from the second intermediate chamber 159b to the collector chamber 152. The first control valve 264a includes a first valve member 171a that is moveable along a first control valve axis VA1 between an open position and a closed position. The second control valve 264b includes a second valve member 171b that is moveable along a second control valve axis VA2 between an open position and a closed position. Although other configurations are possible, in the illustrated embodiment, wherein the first and second control valve axes VA1 and VA2 are parallel and longitudinally spaced apart from one another and are arranged perpendicular to the longitudinal axis A of the piston rod 134.

The electronic controller 120 may regulate the first and second control valves 164a, 164b in order to control the damping level of the damper 112. The first and second control valves 164a, 164b may be controlled by input currents provided to the solenoids of the first and second control valves 164a, 164b. The electronic controller 120 generates the input current in order to control the operation and the damping level of the damper 112. The solenoids of the first and second control valves 164a, 164b may be connected in electrical communication with the electronic controller 120. Further, the input current may vary between lower and upper limits, which correspond to the least and most restrictive positions (i.e., an open position and a closed position) of the first and second control valves 164a, 164b. The electronic controller 120 may control the damping force or level by controlling a degree of restriction of the first and second control valves 164a, 164b. Specifically, the electronic controller 120 may regulate the input currents to vary the restriction of the first and second control valves 164a, 164b. Sending a low current to the first and second control valves 164a, 164b may correspond to a low damping ratio or damping level. Similarly, sending a high current to the first and second control valves 164a, 164b may correspond to a high damping ratio or damping level.

The first control valve 164a has a first control valve inlet 170a that is arranged in fluid communication with the fluid transport chamber 138 between the inner and outer tubes 122, 136 and a first control valve outlet 172a that is arranged in fluid communication with the collector chamber 152. The first port 140 in the outer tube 136 is arranged in fluid communication with and extends between the fluid transport chamber 138 and the first control valve inlet 170a.

The second control valve 164b has a second control valve inlet 170b that is arranged in fluid communication with the second intermediate chamber 159b and a second control valve outlet 172b that is arranged in fluid communication with the collector chamber 152. The second port 142 in the outer tube 136 is arranged in fluid communication with and extends between the second intermediate chamber 159b and the second control valve inlet 170b. The third port 144 in the outer tube 136 is arranged in fluid communication with and extends between the collector chamber 152 and the accumulation chamber 162. The fourth port 146 in the outer tube 136 is arranged in fluid communication with and extends between the collector chamber 152 and the first intermediate chamber 159a. As a result, the accumulator chamber 162 is arranged in fluid communication with the collector chamber 152 via the third port 144 in the outer tube 136 and the first intermediate chamber 159a is arranged in fluid communication with the collector chamber 152 via the fourth port 146 in the outer tube 136.

During an extension (i.e., rebound) stroke of the damper 112, the first control valve 164a is operable to regulate fluid flow from the fluid transport chamber 138 to the collector chamber 152 in response to movement of the piston 124 towards the rod guide 141. The first control valve 164a is in the open position during extension strokes of the damper 112 to control rebound damping characteristics of the damper 112. Specifically, the degree of opening of the first control valve 164a may be regulated to adjust the extension/rebound damping characteristics of the damper 112. The second control valve 164b is in the closed position during extension strokes of the damper 112. As a result, there is no communication of fluid directly between the second intermediate chamber 159b and the collector chamber 152 during an extension stroke.

During a compression stroke, the second control valve 164b is operable to regulate fluid flow from the second intermediate chamber 159b to the collector chamber 152 in response to movement of the piston 124 towards the intake valve assembly 154. The second control valve 164b is in the open position during compression strokes of the damper 112 to control compression damping characteristics of the damper 112. Specifically, the degree of opening of the second control valve 164b may be regulated to adjust the compression damping characteristics of the damper 112. The first control valve 164a is in the closed position during compression strokes of the damper 112. As a result, there is no communication of fluid directly between the fluid transport chamber 138 and the collector chamber 152 during a compression stroke.

In the illustrated example, each of the first and second control valves 164a, 164b includes a control valve housing 168a, 168b. A portion of each control valve housing 168a, 168b is received within and extends through the cover member 148. Though the first and second ports 140, 142 in the outer tube 136 are illustrated as circular apertures in FIG. 2, the shape and dimensions of the first and second ports 140, 142 in the outer tube 136 may be based on any shape and dimensions of the control valve housings 168a, 168b.

In the open position, the first control valve 164a allows fluid communication between the fluid transport chamber 138 and the collector chamber 152. More particularly, the first control valve inlet 170a is in fluid communication with the fluid transport chamber 138 and the first control valve outlet 172a is in fluid communication with the collector chamber 152. The first valve member 171a allows selective fluid communication between the first control valve inlet 170a and the first control valve outlet 172a and therefore selective fluid flow between the fluid transport chamber 138 and the collector chamber 152, which ultimately regulates fluid flow from the first working chamber 126 to the accumulation chamber 162.

In the open position, the second control valve 164b allows fluid communication between the first intermediate chamber 159a and the collector chamber 152. More particularly, the second control valve inlet 170b is in fluid communication with the first intermediate chamber 159a and the second control valve outlet 172b is in fluid communication with the collector chamber 152. The second valve member 171b allows selective fluid communication between the second control valve inlet 170b and the second control valve outlet 172b and therefore selective fluid flow between the first intermediate chamber 159a and the collector chamber 152, which ultimately regulates fluid flow from the second working chamber 128 to the accumulation chamber 162.

The intake valve assembly 154 allows bi-directional flow of fluid between the accumulation chamber 162 to the second working chamber 128. During compression strokes, the volume of the first working chamber 126 increases as the piston 124 moves towards the intake valve assembly 154. The first intake valve 165a in the intake valve assembly 154 provides a compensating fluid flow where fluid from the second control valve outlet 172b flows into the collector chamber 152, through the fourth port 146 in the outer tube 136, through the first intermediate chamber 159a, through the first set of intake orifices 158b in the first intake valve body 155a, into the fluid transport chamber 138, and ultimately into the first working chamber 126 to increase the amount of fluid in the first working chamber 126. During extension/rebound strokes, the volume of the first working chamber 126 decreases as the piston 124 moves away from the intake valve assembly 154. The second intake valve 165b in the intake valve assembly 154 provides a compensating fluid flow where fluid in the accumulation chamber 162 flows through the intake valve assembly 154 and into the second working chamber 128 to increase the amount of fluid in the second working chamber 128.

Operation of the damper 112 during the rebound and compression strokes will now be explained in greater detail.

Figure 4:
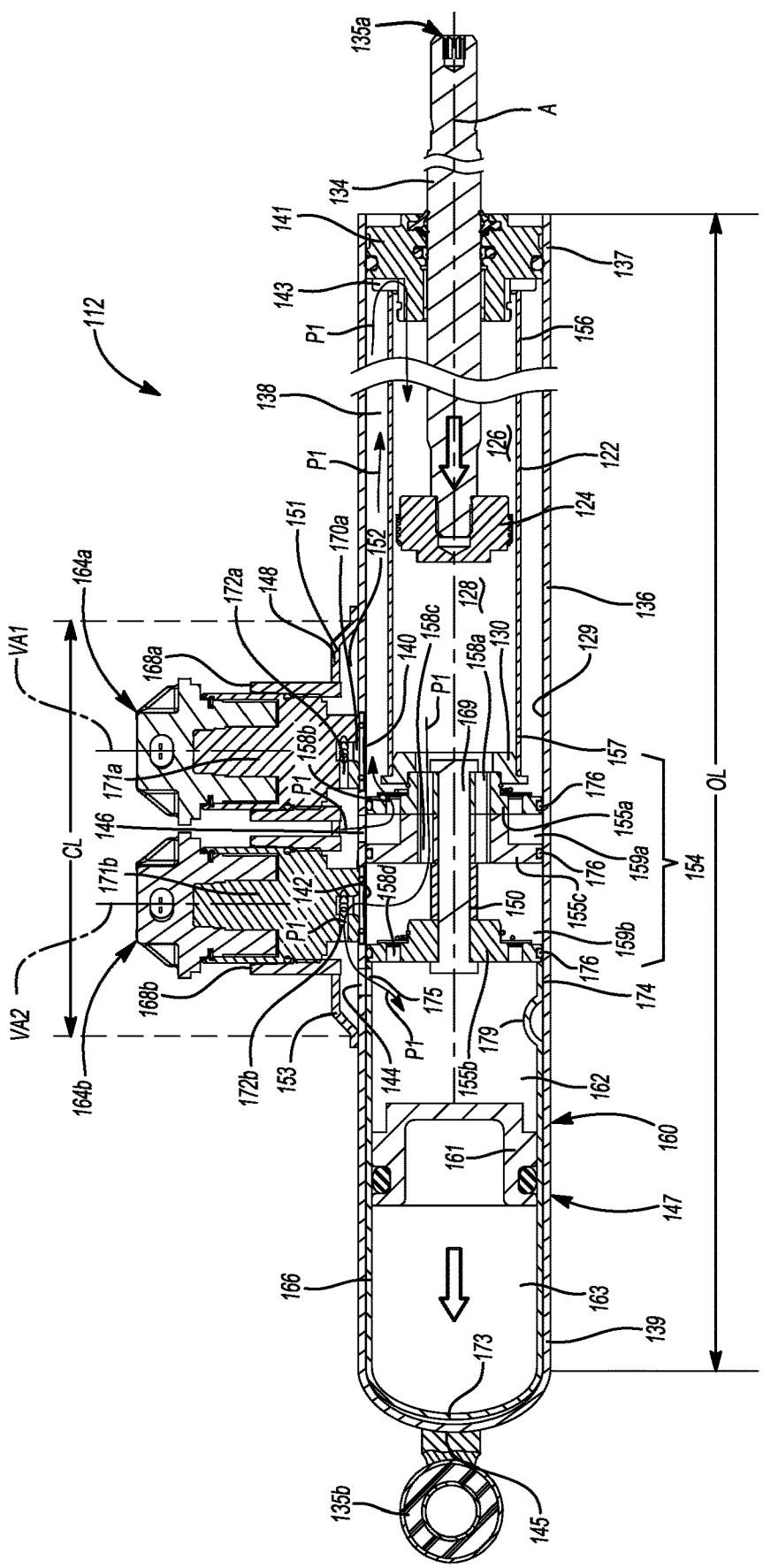
FIG. 4 is an enlarged side cross-sectional view of the exemplary damper shown in FIG. 3, where arrows are included illustrating the fluid flow path through the damper during a compression stroke.

With reference to FIG. 4, the damper 112 is shown in a compression stroke, which occurs when the piston 124 moves towards the intake valve assembly 154. During a compression stroke, the volume of the fluid in the first working chamber 126 that is displaced by the piston rod 134 increases and the volume of the second working chamber 128 decreases. An additional flow of fluid must be supplied to the first working chamber 126 to compensate for the increase in the volume of the first working chamber 126. Further, during the compression stroke, there is a net flow of fluid into the accumulation chamber 162, which causes the floating piston 161 to move away from the intake valve assembly 154, increasing the size of the accumulation chamber 162. This net flow of fluid into the accumulation chamber 162 occurs due to the increase in the volume of the piston rod 134 in the first working chamber 126.

During a compression stroke, the first control valve 164a is in a closed position, the second control valve 164b is in an open position, and the piston 124 moves towards the intake valve assembly 154. A compression flow path P1 is defined inside the damper 112, where fluid in the second working chamber 128 flows through the first set of passages 158a in the first intake valve body 155a, through the second set of passages 158c in the divider body 155c, and into the second intermediate chamber 159b. Fluid in the second intermediate chamber 159b flows to the second control valve inlet 170b and passes through the second port 142 in the outer tube 136. Fluid from the second control valve inlet 170b flows to the second control valve outlet 172b because the second control valve 164b is in the open position and fluid from the second control valve outlet 172b flows into the collector chamber 152. The fluid flowing into the collector chamber 152 flows into the accumulation chamber 162 via the third port 144 in the outer tube 136 and into the first intermediate chamber 159a via the fourth port 146. If the pressure differential between the first intermediate chamber 159a and the fluid transport chamber 138 exceeds the break pressure of the first intake valve 165a, the first intake valve 165a will open and fluid will flow through the first set of intake orifices 158b in the first intake valve body 155a, through the fluid transport chamber 138, and through the rod guide passages 143 into the first working chamber 126, which increases in volume during compression strokes.

Figure 5:
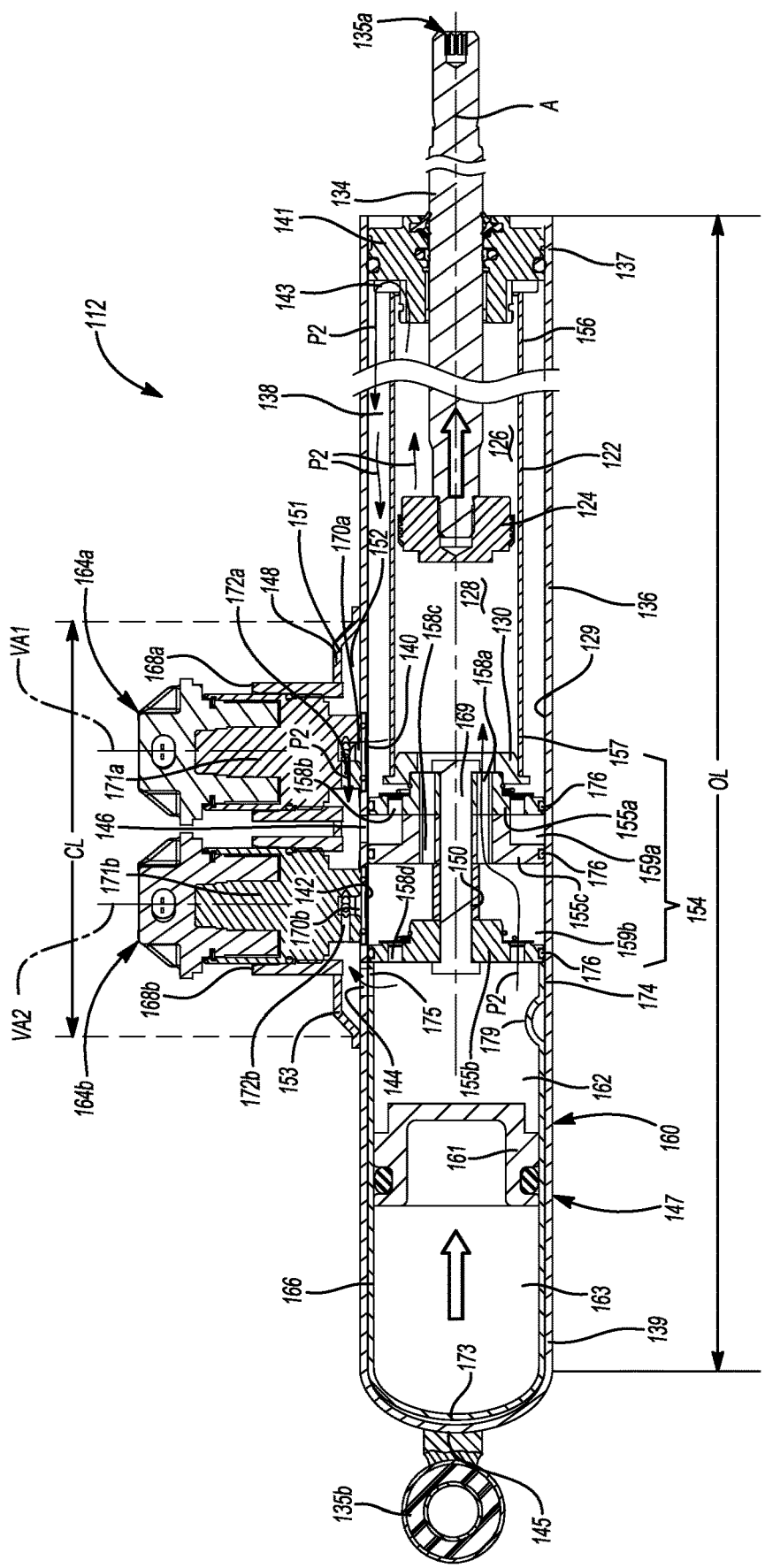
FIG. 5 is another enlarged side cross-sectional view of the exemplary damper shown in FIG. 3, where arrows are included illustrating the fluid flow path through the damper during an extension stroke.

With reference to FIG. 5, the damper 112 is shown in an extension/rebound stroke, which occurs when the piston 124 moves away from the intake valve assembly 154. During the extension/rebound stroke, the volume of the fluid in the first working chamber 126 that is displaced by the piston rod 134 decreases and the volume of fluid in the second working chamber 128 increases. An additional flow of fluid must be supplied to the second working chamber 128 to compensate for the increase in the volume of the second working chamber 128. In order to increase the amount of fluid in the second working chamber 128, some portion of the fluid from the accumulation chamber 162 flows through the intake valve assembly 154 and into the second working chamber 128 such that an extension flow path P2 is defined within the damper 112. Further, during the extension/rebound stroke, there is a net flow of fluid out of the accumulation chamber 162, which causes the floating piston 161 to move towards the intake valve assembly 154, decreasing the size of the accumulation chamber 162. This net flow of fluid out of the accumulation chamber 162 occurs due to the decrease in the volume of the piston rod 134 in the first working chamber 126.

During an extension/rebound stroke, the first control valve 164a is in an open position, the second control valve 164b is in a closed position, and the piston 124 moves away from the intake valve assembly 154. Fluid in the first working chamber 126 flows into the fluid transport chamber 138 via the rod guide passages 143. Fluid in the fluid transport chamber 138 then flows to the first control valve inlet 170a and passes through the first port 140 in the outer tube 136. Fluid from the first control valve inlet 170a flows to the first control valve outlet 172a because the first control valve 164a is in the open position and fluid from the first control valve outlet 172a flows into the collector chamber 152. Fluid from the collector chamber 152 flows into the accumulation chamber 162 via the third port 144 in the outer tube 136. Finally, fluid in the accumulation chamber 162 flows through the intake valve assembly 154 and into the second working chamber 128. When the pressure differential between the accumulation chamber 162 and the second intermediate chamber 159b exceeds the break pressure of the second intake valve 165b, the second intake valve 165b will open and fluid in the accumulation chamber 162 will flow through the second set of intake orifices 158d in the second intake valve body 155b, through the second intermediate chamber 159b, through the second set of passages 158c in the divider body 155c, through the first set of passages 158a in the first intake valve body 155a, and into the second working chamber 128, which increases in volume during extension/rebound strokes.

Figure 8:
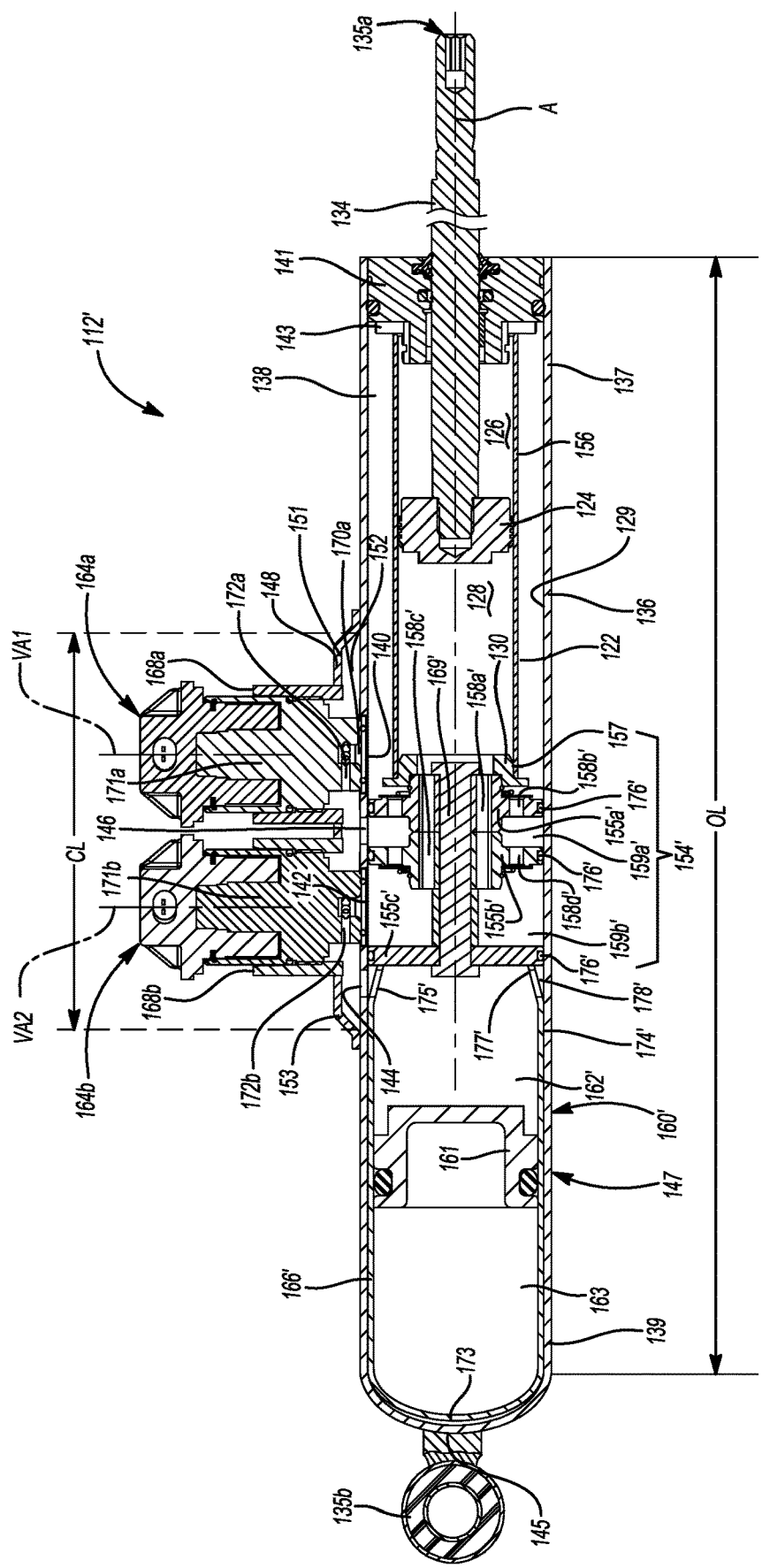
FIG. 8 is a side cross-sectional view of another exemplary damper constructed in accordance with the present disclosure.
Figure 9:
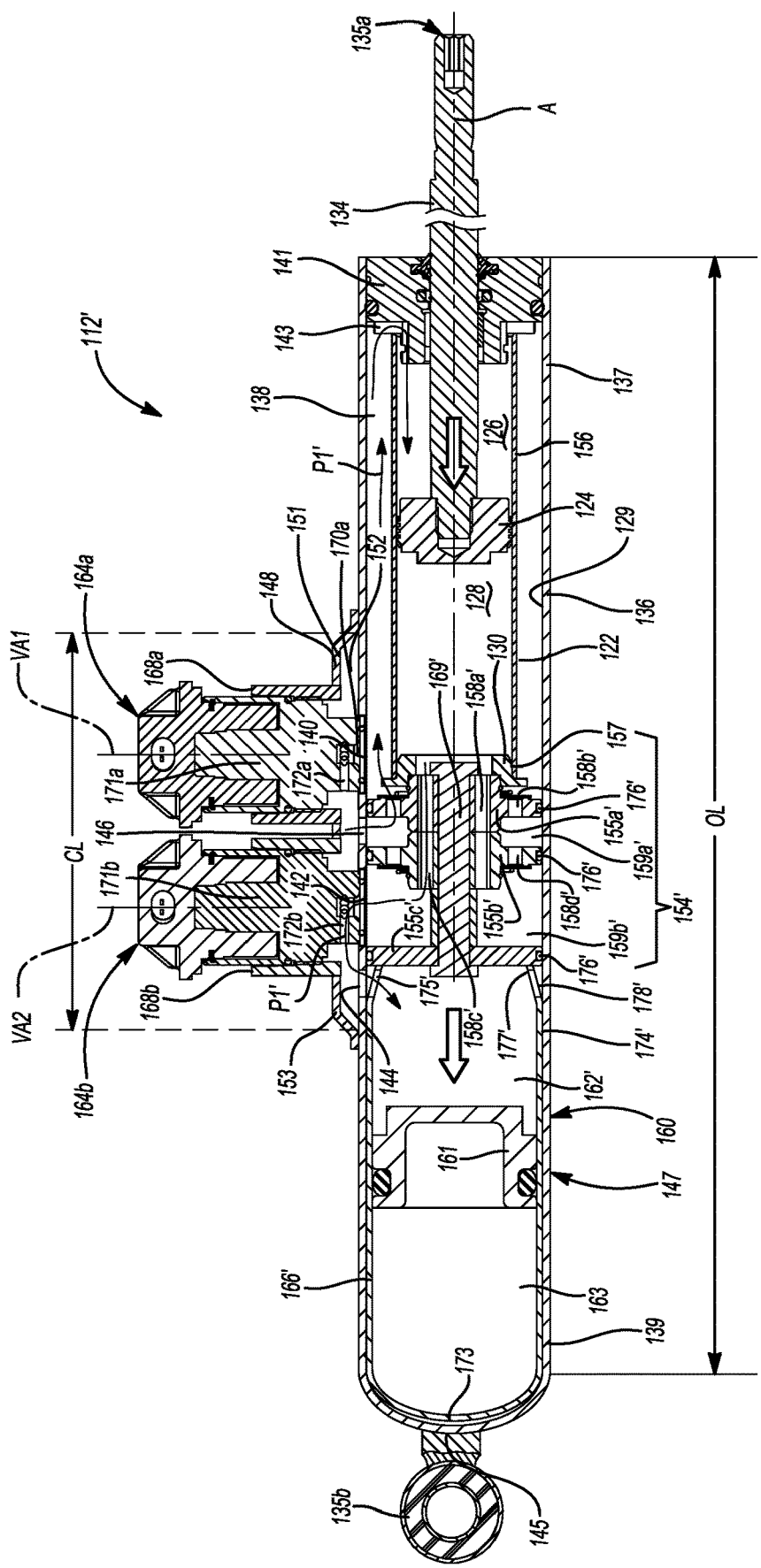
FIG. 9 is an enlarged side cross-sectional view of the exemplary damper shown in FIG. 8, where arrows are included illustrating the fluid flow path through the damper during a compression stroke.

FIGS. 8 and 9 illustrate another exemplary damper 112', with an intake valve assembly 154' of an alternative configuration. Many of the elements of the damper 112' shown in FIGS. 8 and 9 are the same as the elements of the damper 112 shown in FIGS. 2 and 3 and therefore share the same reference numbers. The elements in FIGS. 8 and 9 that are new, different, or have been modified are labeled with reference numbers where a prime (') annotation has been appended after the reference numeral.

The intake valve assembly 154' is disposed inside the outer tube 136 and includes a first intake valve body 155a' that abuts the adapter ring 130, a second valve body 155b', and a divider body 155c'. In accordance with this alternative arrangement, the second valve body 155b' is positioned longitudinally between the first intake valve body 155a' and the divider body 155c'. The intake valve assembly 154' also includes a spacer 150' that is positioned longitudinally between the second intake valve body 155b' and the divider body 155c'.

The first and second intake valve bodies 155a', 155b' and the divider body 155c' abut the inner cylindrical surface 129 of the outer tube 136 to define first and second intermediate chambers 159a', 159b' inside the outer tube 136. The first intermediate chamber 159a' is positioned longitudinally between the first and second intake valve bodies 155a', 155b'. The second intermediate chamber 159b' is positioned longitudinally between the second intake valve body 155b' and the divider body 155c'. An accumulation chamber 162' is positioned longitudinally between the divider body 155c' and the second outer tube end 139. The first intake valve body 155a' forms a partition between the first intermediate chamber 159a' and the fluid transport chamber 138, the second intake valve body 155b' forms a partition between the first and second intermediate chambers 159a', 159b', and the divider body 155c' forms a partition between the second intermediate chamber 159b' and the accumulation chamber 162'.

In accordance with this embodiment, the damper 112' includes an accumulator insert 160' that is disposed within the second outer tube end 139. The accumulator insert 160' includes an accumulator sleeve 166', a floating piston 161, and a pressurized chamber (e.g., a gas chamber) 163. The accumulator sleeve 166' is positioned inside the outer tube 136 and extends between a closed end 173 adjacent to the second outer tube end 139 and an open end 174' adjacent to the intake valve assembly 154'. The floating piston 161 is preassembled inside the accumulator sleeve 166' in a sliding fit. The pressurized chamber 163 is sealably separated from the accumulation chamber 162' by the floating piston 161. Therefore, the accumulation chamber 162' is positioned longitudinally between the intake valve assembly 154' and the floating piston 161 and at least part of the accumulation chamber 162' is disposed inside the accumulator sleeve 166'. The accumulator chamber 162' contains a fluid and is arranged in fluid communication with the collector chamber 152 via the third port (i.e., the accumulator port) 144 in the outer tube 136 and multiple aperture 175' in the accumulator sleeve 166' that are arranged in fluid communication with the third port/accumulator port 144. The pressurized chamber 163 is positioned longitudinally between the floating piston 161 and the closed end 173. The pressurized chamber 163 contains a pressurized fluid, such as a gas, that operates to bias the floating piston 161 towards the intake valve assembly 154'.

The accumulator sleeve 166' extends longitudinally between the second outer tube end 139 and the intake valve assembly 154' such that the closed end 173 of the accumulator sleeve 166' abuts (i.e., contacts) the closed portion 145 of the second outer tube end 139 and such that the open end 174' of the accumulator sleeve 166 abuts the divider body 155c' of the intake valve assembly 154'. Again, the accumulator sleeve 166' is arranged in a slip fit within the outer tube 136 and applies a preload on the intake valve assembly 154' such that the intake valve assembly 154' is clamped between the open end 174' of the accumulator sleeve 166' and the second inner tube end 157 of inner tube 122. In accordance with this arrangement, the first and second intake valve bodies 155a', 155b' and the divider body 155c' do not need to be mechanically attached to the outer tube 136 (such as by welding) because the intake valve assembly 154' is held in place by the accumulator sleeve 166' and the inner tube 122. O-ring seals 176', positioned on the first and second intake valve bodies 155a', 155b' and the divider body 155c', are arranged in sealing contact with the inside cylindrical surface 129 of the outer tube 136.

In accordance with this embodiment, the open end 174' of the accumulator sleeve 166' has an inwardly tapering rim 177'. This inwardly tapering rim 177' has a frusto-conical shape such that an annular gap 178' is created between the inwardly tapering rim 177' and the inside cylindrical surface 129 of the outer tube 136. This annular gap 178' is longitudinally aligned and arranged in fluid communication with the accumulator port/third port 144 in the outer tube 136. The apertures 175' in the accumulator sleeve 166' are positioned along the inwardly tapering rim 177' at circumferentially spaced locations such that fluid in the accumulation chamber 162' can flow into the annular gap 178' and through the accumulator port/third port 144 in the outer tube 136 or in the opposite direction from the collector chamber 152 to the accumulation chamber 162'. This arrangement therefore eliminates the need to ensure alignment between the aperture(s) 175, 175' and the accumulator port/third port 144 in the outer tube 136. In addition, the inwardly tapering rim 177' functions to retain the floating piston 161 inside the accumulator sleeve 166' after the pressurized chamber 163 has been filled (i.e., charged) with pressurized gas.

Damper 112' may be manufactured using the same method described above, but with the additional step of forming the inwardly tapering rim 177' at the open end 174' of the accumulator sleeve 166' after the step of inserting the floating piston 161 into the open end 174' of the accumulator sleeve 166' instead of forming the indent 179 in the accumulator sleeve 166. This step of forming the inwardly tapering rim 177' prevents the pressurized gas in the accumulator insert 160' from pushing the floating piston 161 back out through the open end 174' of the accumulator sleeve 166'. In addition, the step of forming an aperture 175' in the accumulator sleeve 166' may include forming multiple apertures 175' at circumferentially spaced positions in the inwardly tapering rim 177'.

Although other configurations may be possible, in the illustrated example, each of the first and second intake valve bodies 155a', 155b' has a cylindrical hub portion and a disc-like flange such that the first and second intake valve bodies 155a', 155b' have shapes similar to that of a top hat. In this configuration, the divider body 155c' is shaped like a solid disk. In this embodiment, there are no orifices or passages in the divider body 155c'. As a result, the divider body 155c' acts as a fluid flow obstruction such that there is no fluid flow through the divider body 155c'. The first and second intake valve bodies 155a', 155b' and the divider body 155c' can be pre-assembled prior to insertion into the damper 112' by a fastener 169' such as a bolt or a rivet that clamps the first and second intake valve bodies 155a', 155b' and the divider body 155c' together.

Figure 11:
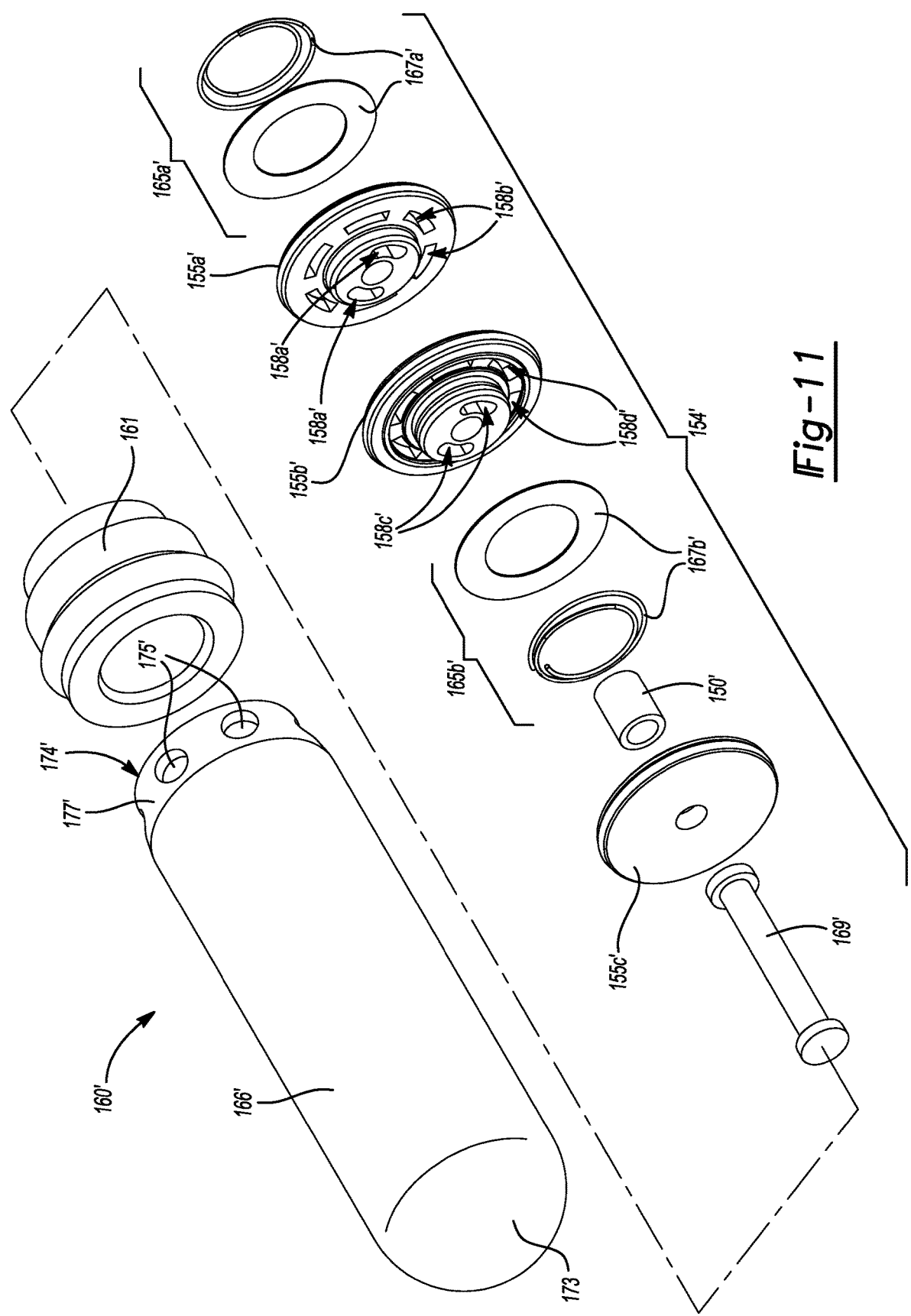
FIG. 11 is a front exploded perspective view of another exemplary intake valve assembly and accumulator insert of the exemplary damper shown in FIG. 8.
Figure 12:
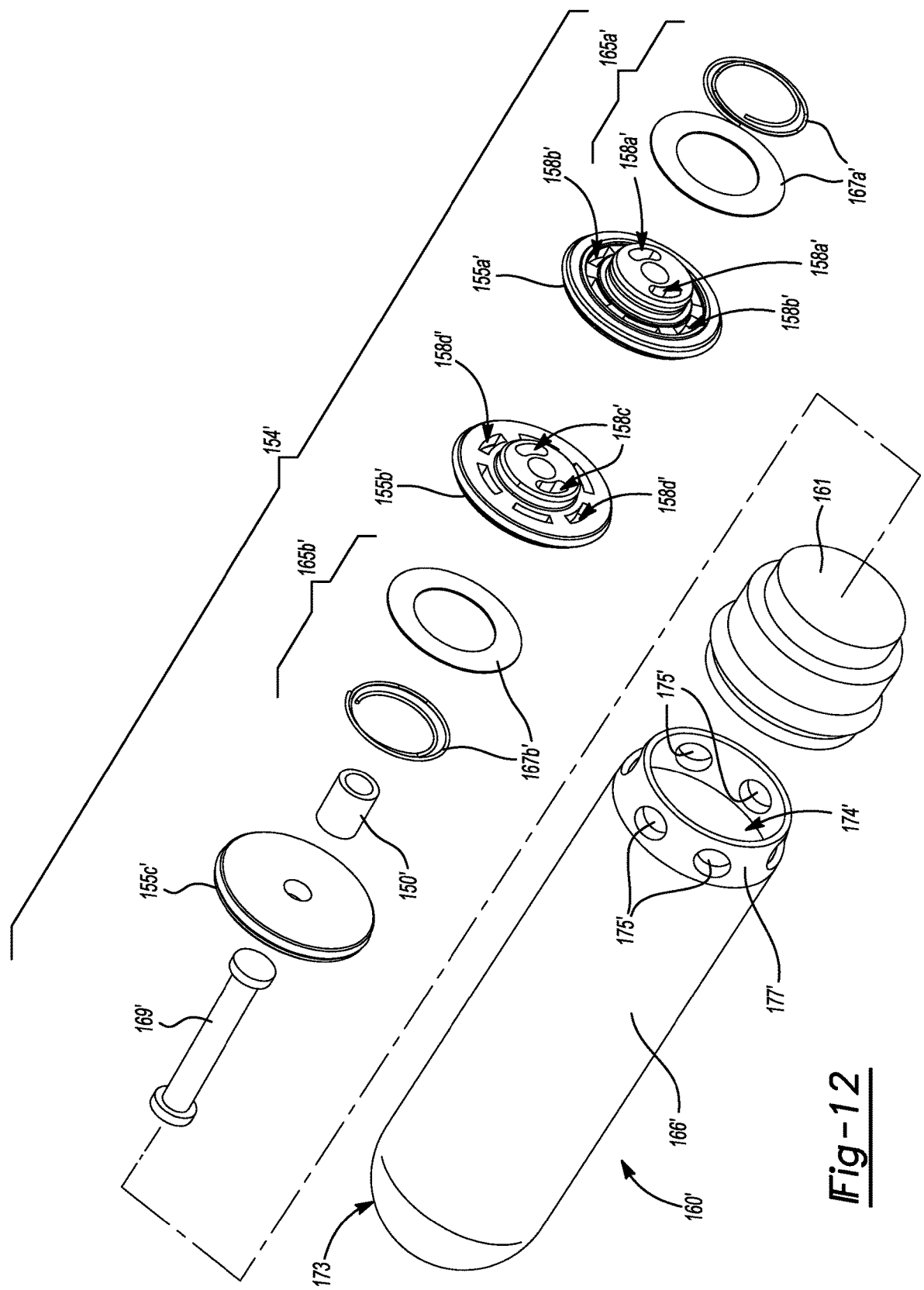
FIG. 12 is a rear exploded perspective view of the exemplary intake valve assembly and accumulator insert of the exemplary damper shown in FIG. 8.

The first intermediate chamber 159a' and the accumulation chamber 162 are each arranged in fluid communication with the collector chamber 152 via third and fourth ports 144, 146 in the outer tube 136. With additional reference to FIGS. 11 and 12, the first intake valve body 155a' includes a first set of passages 158a' and a first set of intake orifices 158b' that extend through the first intake valve body 155a'. The first set of intake orifices 158b' are arranged circumferentially around (i.e., are radially outward of) the first set of passages 158a'. The second intake valve body 155b' includes a second set of passages 158c' and a second set of intake orifices 158d' that extend through the second intake valve body 155b'. The second set of intake orifices 158d' are arranged circumferentially around (i.e., are radially outward of) the second set of passages 158c'. The first set of passages 158a' in the first intake valve body 155a' are aligned with and arranged in fluid communication with the second set of passages 158c' in the second intake valve body 155b'. As a result, fluid can flow between the second intermediate chamber 159b' and the second working chamber 128' via the first and second set of passages 158a', 158c'.

The first set of intake orifices 158b' allow fluid communication between the first intermediate chamber 159a' and the fluid transport chamber 138. The intake valve assembly 154' further comprises a first intake valve 165a' that controls fluid flow through the first set of intake orifices 158b' between the first intermediate chamber 159a' and the fluid transport chamber 138. In the illustrated example, the first intake valve 165a' is a passive valve. More specifically, in the illustrated embodiment, the first intake valve 165a' includes a first spring disc stack 167a' that is mounted to the first intake valve body 155a'. In operation, the first spring disc stack 167a' opens and closes the first intake orifices 158b' by flexing towards and away from the first intake valve body 155a' based on a pressure differential between the first intermediate chamber 159a' and the fluid transport chamber 138. The first intake valve 165a' acts as a one-way valve that permits fluid flow in only one direction from the first intermediate chamber 159a' to the fluid transport chamber 138. As will be explained in greater detail below, this one-way flow through the first intake valve 165a' occurs during compression strokes, which is where the piston 124 moves toward the intake valve assembly 154'.

The second set of intake orifices 158d' allow fluid communication between the first and second intermediate chambers 159a', 159b'. The intake valve assembly 154' further comprises a second intake valve 165b' that controls fluid flow through the second set of intake orifices 158d' between the first and second intermediate chambers 159a', 159b'. In the illustrated example, the second intake valve 165b' is a passive valve. More specifically, in the illustrated embodiment, the second intake valve 165b' includes a second spring disc stack 167b' that is mounted to the second intake valve body 155b'. In operation, the second spring disc stack 167b' opens and closes the second intake orifices 158d' by flexing towards and away from the second intake valve body 155b' based on a pressure differential between the first intermediate chamber 159a' and the second intermediate chamber 159b'. The second intake valve 165b' acts as a one-way valve that permits fluid flow in only one direction from the first intermediate chamber 159a' and the second intermediate chamber 159b'. As will be explained in greater detail below, this one-way flow through the second intake valve 165b' occurs during extension strokes, which is where the piston 124 moves away from the intake valve assembly 154'.

The intake valve assembly 154' allows bi-directional flow of fluid between the accumulation chamber 162 to the second working chamber 128. During compression strokes, the volume of the first working chamber 126 increases as the piston 124 moves towards the intake valve assembly 154'. The first intake valve 165a' in the intake valve assembly 154' provides a compensating fluid flow where fluid from the second control valve outlet 172b flows into the collector chamber 152, through the fourth port 146 in the outer tube 136, through the first intermediate chamber 159a', through the first set of intake orifices 158b' in the first intake valve body 155a', into the fluid transport chamber 138, and ultimately into the first working chamber 126 to increase the amount of fluid in the first working chamber 126. During extension/rebound strokes, the volume of the first working chamber 126 decreases as the piston 124 moves away from the intake valve assembly 154'. The second intake valve 165b' in the intake valve assembly 154' provides a compensating fluid flow where fluid in the accumulation chamber 162 flows through the intake valve assembly 154' and into the second working chamber 128 to increase the amount of fluid in the second working chamber 128.

Operation of the damper 112' during the rebound and compression strokes will now be explained in greater detail.

With reference to FIG. 9, the damper 112' is shown in a compression stroke, which occurs when the piston 124 moves towards the intake valve assembly 154'. During a compression stroke, the volume of the fluid in the first working chamber 126 that is displaced by the piston rod 134 increases and the volume of the second working chamber 128 decreases. An additional flow of fluid must be supplied to the first working chamber 126 to compensate for the increase in the volume of the first working chamber 126. Further, during the compression stroke, there is a net flow of fluid into the accumulation chamber 162, which causes the floating piston 161 to move away from the intake valve assembly 154', increasing the size of the accumulation chamber 162. This net flow of fluid into the accumulation chamber 162 occurs due to the increase in the volume of the piston rod 134 in the first working chamber 126.

During a compression stroke, the first control valve 164a is in a closed position, the second control valve 164b is in an open position, and the piston 124 moves towards the intake valve assembly 154'. A compression flow path P1' is defined inside the damper 112', where fluid in the second working chamber 128 flows through the first set of passages 158a' in the first intake valve body 155a', through the second set of passages 158c' in the second intake valve body 155b', and into the second intermediate chamber 159b'. Fluid in the second intermediate chamber 159b' flows to the second control valve inlet 170b and passes through the second port 142 in the outer tube 136. Fluid from the second control valve inlet 170b flows to the second control valve outlet 172b because the second control valve 164b is in the open position and fluid from the second control valve outlet 172b flows into the collector chamber 152. Fluid from the collector chamber 152 flows into the accumulation chamber 162 via the third port 144 in the outer tube 136 and into the first intermediate chamber 159a' via the fourth port 146. If the pressure differential between the first intermediate chamber 159a' and the fluid transport chamber 138 exceeds the break pressure of the first intake valve 165a', the first intake valve 165a' will open and fluid will flow through the first set of intake orifices 158b' in the first intake valve body 155a', through the fluid transport chamber 138, and through the rod guide passages 143 into the first working chamber 126, which increases in volume during compression strokes.

Figure 10:
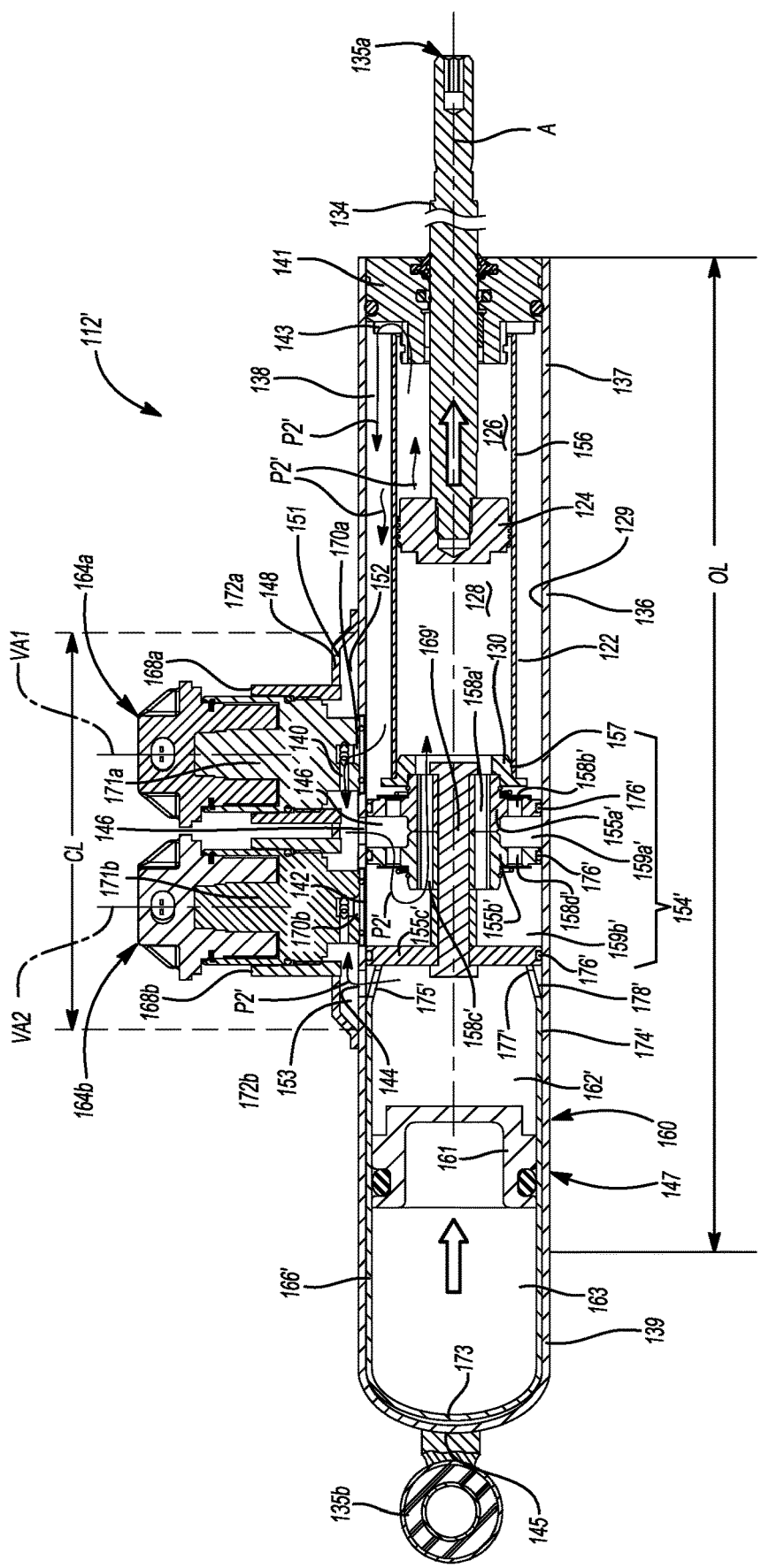
FIG. 10 is another enlarged side cross-sectional view of the exemplary damper shown in FIG. 8, where arrows are included illustrating the fluid flow path through the damper during an extension stroke.

With reference to FIG. 10, the damper 112' is shown in an extension/rebound stroke, which occurs when the piston 124 moves away from the intake valve assembly 154'. During the extension/rebound stroke, the volume of the fluid in the first working chamber 126 that is displaced by the piston rod 134 decreases and the volume of fluid in the second working chamber 128 increases. An additional flow of fluid must be supplied to the second working chamber 128 to compensate for the increase in the volume of the second working chamber 128. In order to increase the amount of fluid in the second working chamber 128, some portion of the fluid from the accumulation chamber 162 flows through the intake valve assembly 154' and into the second working chamber 128 such that an extension flow path P2' is defined within the damper 112'. Further, during the extension/rebound stroke, there is a net flow of fluid out of the accumulation chamber 162, which causes the floating piston 161 to move towards the intake valve assembly 154', decreasing the size of the accumulation chamber 162. This net flow of fluid out of the accumulation chamber 162 occurs due to the decrease in the volume of the piston rod 134 in the first working chamber 126.

During an extension/rebound stroke, the first control valve 164a is in an open position, the second control valve 164b is in a closed position, and the piston 124 moves away from the intake valve assembly 154'. Fluid in the first working chamber 126 flows into the fluid transport chamber 138 via the rod guide passages 143. Fluid in the fluid transport chamber 138 then flows to the first control valve inlet 170a and passes through the first port 140 in the outer tube 136. Fluid from the first control valve inlet 170a flows to the first control valve outlet 172a because the first control valve 164a is in the open position and fluid from the first control valve outlet 172a flows into the collector chamber 152. Fluid from the collector chamber 152 flows into the accumulation chamber 162 via the third port 144 in the outer tube 136 and into the first intermediate chamber 159a' via the fourth port 146. When the pressure differential between the first intermediate chamber 159a' and the second intermediate chamber 159b' exceeds the break pressure of the second intake valve 165b', the second intake valve 165b' will open and fluid in the first intermediate chamber 159a' will flow through the second set of intake orifices 158d' in the second intake valve body 155b', through the second intermediate chamber 159b', through the second set of passages 158c' in the second intake valve body 155b', through the first set of passages 158a' in the first intake valve body 155a', and into the second working chamber 128, which increases in volume during extension/rebound strokes.

It should be appreciated that in this embodiment, the first and second intake valve bodies 155a', 155b' are structurally identical and are simply arranged in opposite orientations inside the outer tube 136 so that the first intake valve 165a' is positioned on the side of the first intake valve body 155a' that is closer to the piston 124 and so that the second intake valve 165b' is positioned on the side of the second intake valve body 155b' that is closer to the accumulation chamber 162. Because the first and second intake valve bodies 155a', 155b' are structurally identical, this arrangement reduces the manufacturing cost of intake valve assembly 154' compared to intake valve assembly 154 where the first and second intake valve bodies 155a, 155b need to be manufactured as two different components.

FIGS. 13-21 illustrate another exemplary damper 112", with an intake valve assembly 154" of an alternative configuration. Many of the elements of the damper 112" shown in FIGS. 13-21 are the same or similar to the elements of the dampers 112, 112' shown in FIGS. 2-12 and therefore share the same reference numbers with a double prime (") annotation appended after the reference numeral.

Figure 13:
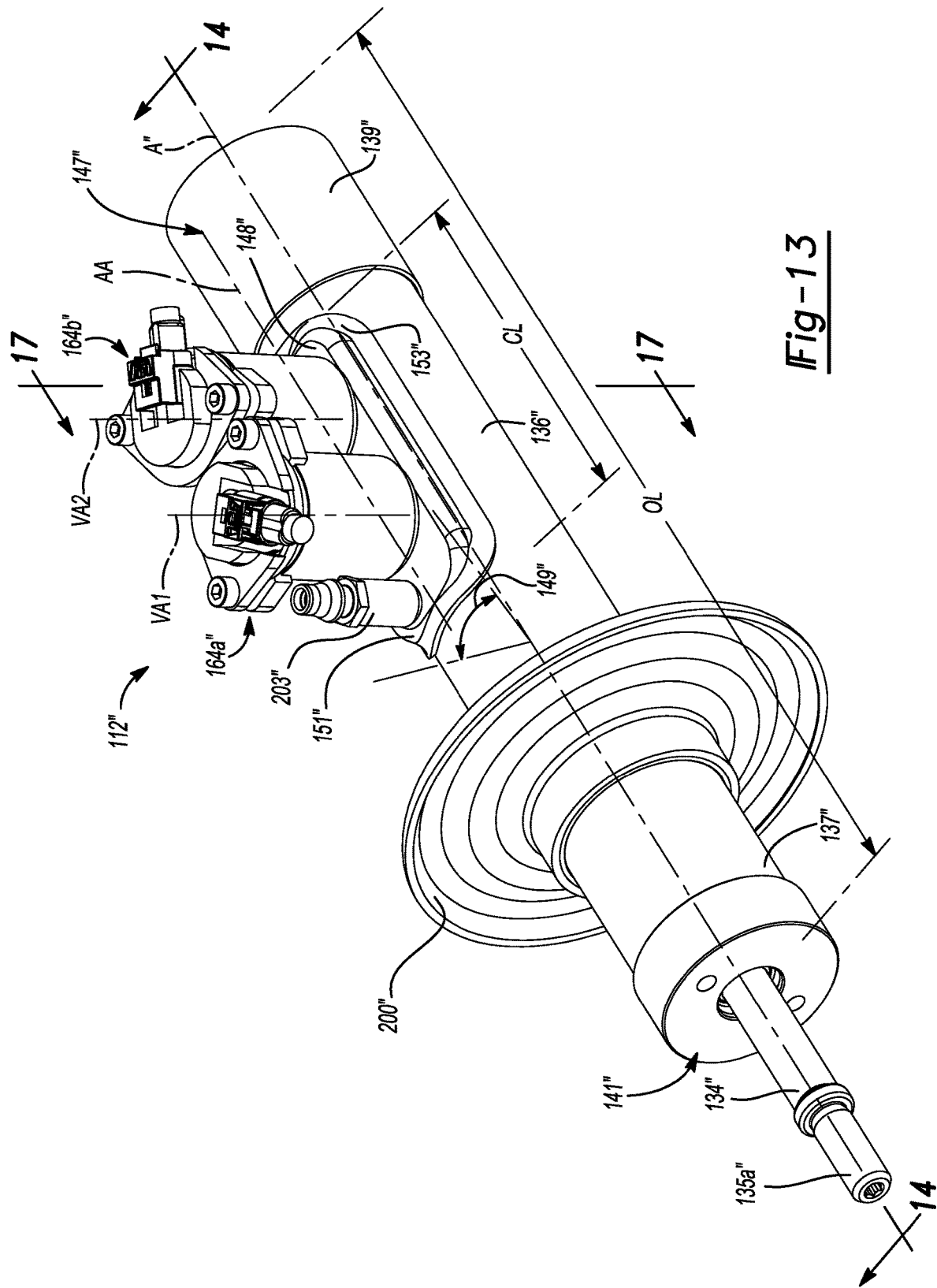
FIG. 13 is a front perspective view of another exemplary damper constructed in accordance with the present disclosure.
Figure 14:
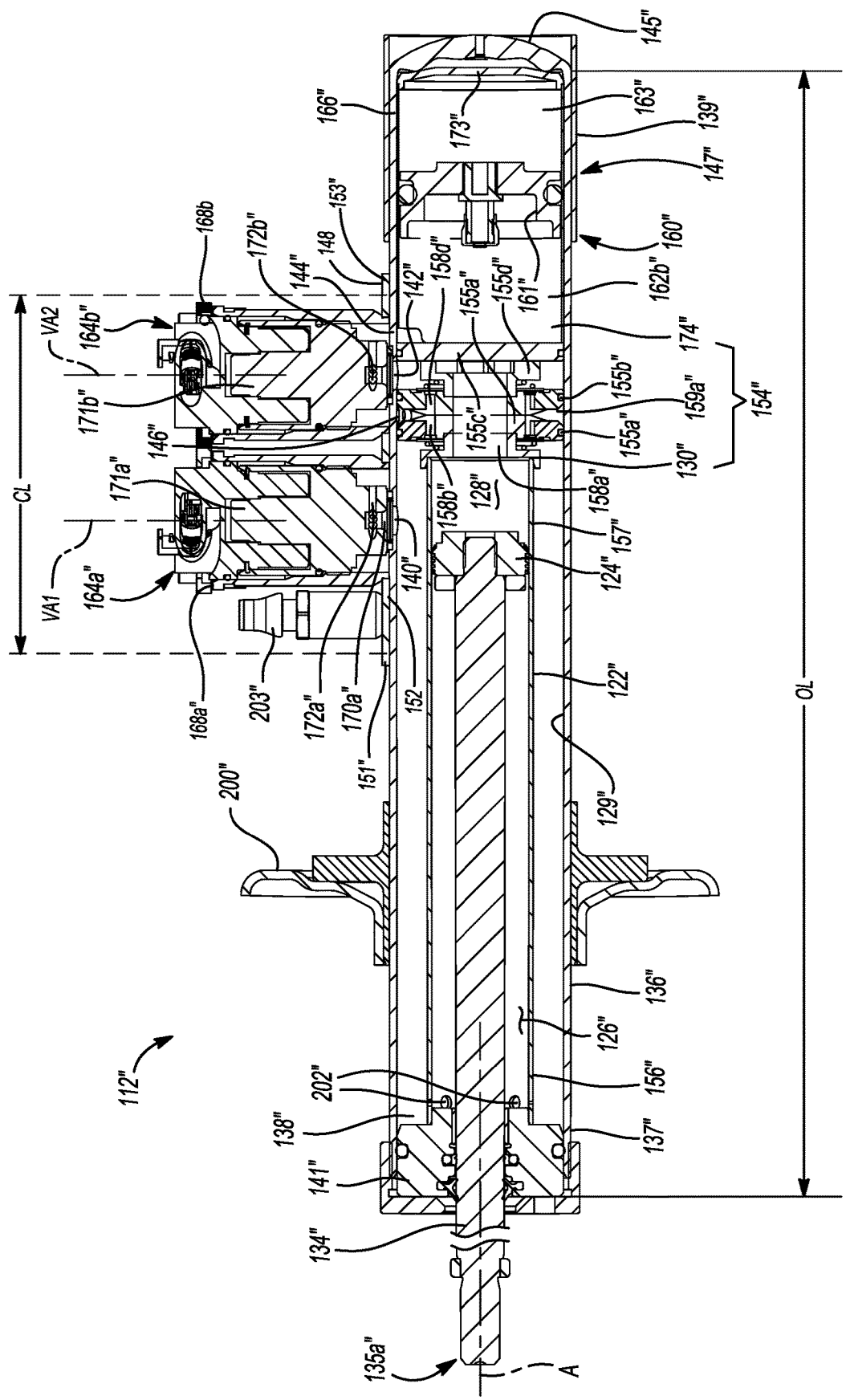
FIG. 14 is a side cross-sectional view of the exemplary damper shown in FIG. 13 taken along line 14-14.

FIGS. 13 and 14 illustrate another exemplary damper 112". The damper 112" may be fitted as any of the four dampers 112 of vehicle 100 illustrated in FIG. 1, for example. The damper 112" includes an inner tube 122" that extends longitudinally between a first inner tube end 156" and a second inner tube end 157". A piston 124" is slidably disposed within the inner tube 122". The piston 124" defines a first working chamber 126" and a second working chamber 128" within the inner tube 122". Each of the first and second working chambers 126", 128" contain hydraulic fluid/oil therein. The first working chamber 126" is positioned longitudinally between the piston 124" and the first inner tube end 156" and acts as a rebound chamber during movement of the piston 124". The second working chamber 128" is positioned longitudinally between the piston 124" and the second inner tube end 157" and acts as a compression chamber. The volume of the first and second working chambers 126", 128" varies based on the movement of the piston 124".

In the illustrated example, the piston 124" seals against the inside of the inner tube 122" and is free of orifices or passages such that there is no fluid flow through the piston 124". In other words, fluid in the first working chamber 126" cannot pass through the piston 124" into the second working chamber 128" or vice versa. However, alternative configurations are possible where the piston 124" may include valving (not shown) to limit high internal pressures within the first and second working chambers 126", 128".

The damper 112" includes a piston rod 134". The piston rod 134" is coaxially aligned with and defines a central longitudinal axis A of the damper 112". One end of the piston rod 134" is connected to the piston 124" and reciprocates with the piston 124" whereas an opposite end of the piston rod 134" includes an attachment fitting 135a" that is configured to be connected to a component of the suspension system 102 or the body 104 of the vehicle 100 as shown in FIG. 1.

The damper 112" also includes an outer tube 136" disposed annularly around the inner tube 122". The outer tube 136" includes an inner cylindrical surface 129" and an outer cylindrical surface 131" opposite the inner cylindrical surface 129". The inner cylindrical surface 129" faces and is spaced from the inner tube 122". In some embodiments, the outer tube 136" is concentrically disposed around the inner tube 122" such that both the inner tube 122" and the outer tube 136" are co-axially aligned with the central longitudinal axis A of the damper 112". The outer tube 136" extends longitudinally between a first outer tube end 137" and a second outer tube end 139". The piston rod 134" extends longitudinally out through the first outer tube end 137". The outer tube 136" includes a closed portion 145" at the second outer tube end 139" and a cylindrical portion 147" that extends from the first outer tube end 137" to the closed portion 145" at the second outer tube end 139". Optionally, a spring seat 200" is mounted to and extends annularly from the outer tube 136" at a location adjacent to the first outer tube end 137". The spring seat 200" may be provided to configure the damper 112" such that it may be used in a coil-over arrangement as shown for the front wheels 116 of the vehicle 100 illustrated in FIG. 1, where spring seat 200" supports one end of the springs 118 illustrated in FIG. 1.

The damper 112" further includes a fluid transport chamber 138" that is disposed between the inner tube 122" and the outer tube 136". The piston rod 134" extends longitudinally through a rod guide 141", which is positioned at the first outer tube end 137". Portions of the rod guide 141" mate with the first outer tube end 137" and the first inner tube end 156". Just inboard of the rod guide 141", the first inner tube end 156" includes one or more openings 202" that provide fluid communication between the first working chamber 126" and the fluid transport chamber 138". Stated another way, the fluid transport chamber 138" is arranged in fluid communication with the first working chamber 126" via the openings 202" in the first inner tube end 156".

The damper 112" further includes a cover member 148" that is attached to the outer cylindrical surface 131" of the outer tube 136". By way of example and without limitation, the cover member 148" may be welded to the outer cylindrical surface 131" of the outer tube 136". A collector chamber 152" is defined between the cover member 148" and the outer tube 136". Thus, in accordance with this arrangement, the collector chamber 152" is positioned external to (i.e., radially outward of) the outer tube 136". Optionally, a charge fitting 203" may be provided on the cover member 148" to provide a location where the collector chamber 152" can be filled or re-filled with hydraulic fluid or oil.

First and second control valves 164a", 164b" are externally mounted to the cover member 148" on the outer tube 136". The operation of the first and second control valves 164a", 164b" will be explained in greater detail below, but at a high level, the first and second control valves 164a", 164b" regulate two fluid flow paths that can transport fluid into and out of the collector chamber 152". The first control valve 264a" has a first control valve axis VA1 and the second control valve 264b" has a second control valve axis VA2. The first and second control valve axes VA1 and VA2 are parallel and longitudinally spaced apart from one another, are circumferentially aligned with one another along a control valve alignment axis AA, and are arranged perpendicular to the central longitudinal axis A and the control valve alignment axis AA. In other words, both the first and second control valve axes VA1 and VA2 intersect the central longitudinal axis A and the control valve alignment axis AA.

In the illustrated example, the collector chamber 152" has a limited circumferential extent that extends about the outer tube in an arc 149" that is less than or equal to 180 degrees. In other words, the collector chamber 152" in the illustrated example runs longitudinally along the outer tube 136" on each side of the control valve alignment axis AA. The outer tube 136" has an outer tube length OL that is measured longitudinally between the first and second outer tube ends 137", 139" and the collector chamber 152" has a collector chamber length CL that is measured longitudinally between first and second collector ends 151", 153". The collector chamber length CL is shorter than the outer tube length OL. In other words, the collector chamber 152" is shorter than the outer tube 136" and does not run along the entire length of the outer tube 136".

With continued reference to FIG. 14, the damper 112" includes an intake valve assembly 154" that is disposed inside the outer tube 136" and includes an adapter ring 130", a first intake valve body 155a" that abuts the adapter ring 130", a second valve body 155b" that abuts the first intake valve body 155a", a divider body 155c", and a toothed ring 155d" that is positioned longitudinally between the second intake valve body 155b" and the divider body 155c" in an abutting arrangement. The adapter ring 130" is press-fit onto the second inner tube end 157" while the first and second intake valve bodies 155a", 155b" and the divider body 155c" abut the inner cylindrical surface 129" of the outer tube 136" to define first and second intermediate chambers 159a", 159b" inside the outer tube 136".

The first intermediate chamber 159a" is positioned longitudinally between the first and second intake valve bodies 155a", 155b" and the second intermediate chamber 159b" is positioned longitudinally between the second intake valve body 155b" and the divider body 155c". An accumulation chamber 162" is positioned longitudinally between the divider body 155c" and the second outer tube end 139". Thus, the first intake valve body 155a" forms a partition between the first intermediate chamber 159a" and the fluid transport chamber 138", the second intake valve body 155b" forms a partition between the first and second intermediate chambers 159a", 159b", and the divider body 155c" forms a partition between the second intermediate chamber 159b" and the accumulation chamber 162".

The intake valve assembly 154" also includes a first intake valve 165a" that is mounted to the first intake valve body 155a", a second intake valve 165b" that is mounted to the second intake valve body 155b", and a central passage 158a" that extends longitudinally through the adapter ring 130", the first and second intake valve bodies 155a", 155b", and the toothed ring 155d". As such, the central passage 158a" extends longitudinally through the intake valve assembly 154" and is arranged in fluid communication with the second working chamber 128" and the second intermediate chamber 159b". The first intake valve 165a" controls fluid flow through the intake valve assembly 154" between the first intermediate chamber 159a" and the fluid transport chamber 138" while the second intake valve 165b" controls fluid flow through the intake valve assembly 154" between the first intermediate chamber 159a" and the second intermediate chamber 159b", which leads to the central passage 158a" and ultimately the second working chamber 128".

In accordance with the illustrated embodiment, the damper 112" includes an accumulator insert 160" that is disposed within the second outer tube end 139". The accumulator insert 160" includes an accumulator sleeve 166", a floating piston 161", and a pressurized chamber (e.g., a gas chamber) 163". The accumulator sleeve 166" is positioned inside the outer tube 136" and extends between a closed end 173" adjacent to the second outer tube end 139" and an open end 174" adjacent to the intake valve assembly 154". The floating piston 161" is preassembled inside the accumulator sleeve 166" in a sliding fit. The pressurized chamber 163" is separated from the accumulation chamber 162" by the floating piston 161". Therefore, the accumulation chamber 162" is positioned longitudinally between the intake valve assembly 154" and the floating piston 161" and the pressurized chamber 163" is positioned longitudinally between the floating piston 161" and the closed end 173". The pressurized chamber 163" contains a pressurized fluid, such as a gas, that operates to bias the floating piston 161" towards the intake valve assembly 154".

The accumulator sleeve 166" extends longitudinally between the second outer tube end 139" and the intake valve assembly 154" such that the closed end 173" of the accumulator sleeve 166" abuts (i.e., contacts) the closed portion 145" of the second outer tube end 139" and such that the open end 174" of the accumulator sleeve 166" abuts the divider body 155c" of the intake valve assembly 154" such that the intake valve assembly 154" is clamped between the open end 174" of the accumulator sleeve 166" and the second inner tube end 157" of inner tube 122". In accordance with this arrangement, the first and second intake valve bodies 155a", 155b" and the divider body 155c" do not need to be mechanically attached to the outer tube 136" (such as by welding) because the intake valve assembly 154" is held in place by the accumulator sleeve 166" and the inner tube 122".

Figure 15:
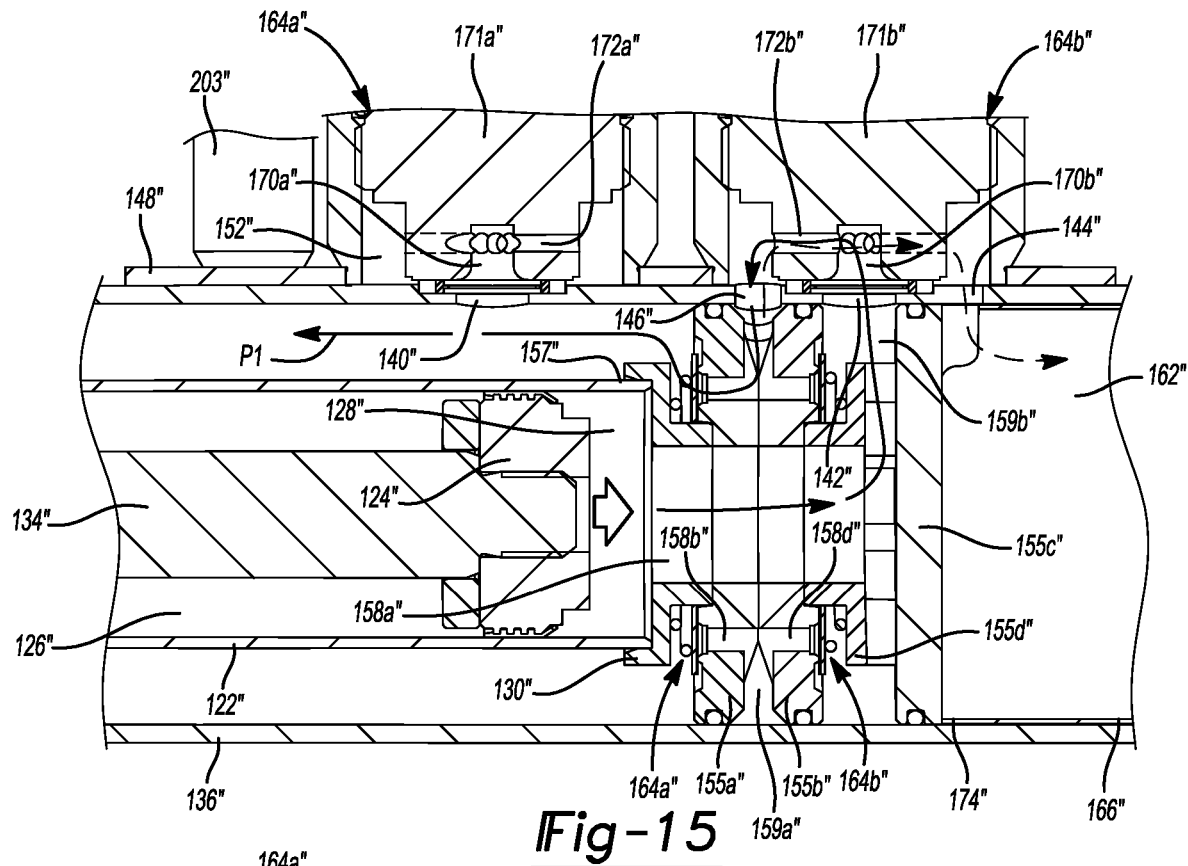
FIG. 15 is an enlarged side cross-sectional view of the exemplary damper shown in FIG. 14, where arrows are included illustrating the fluid flow path through the damper during a compression stroke.
Figure 16:
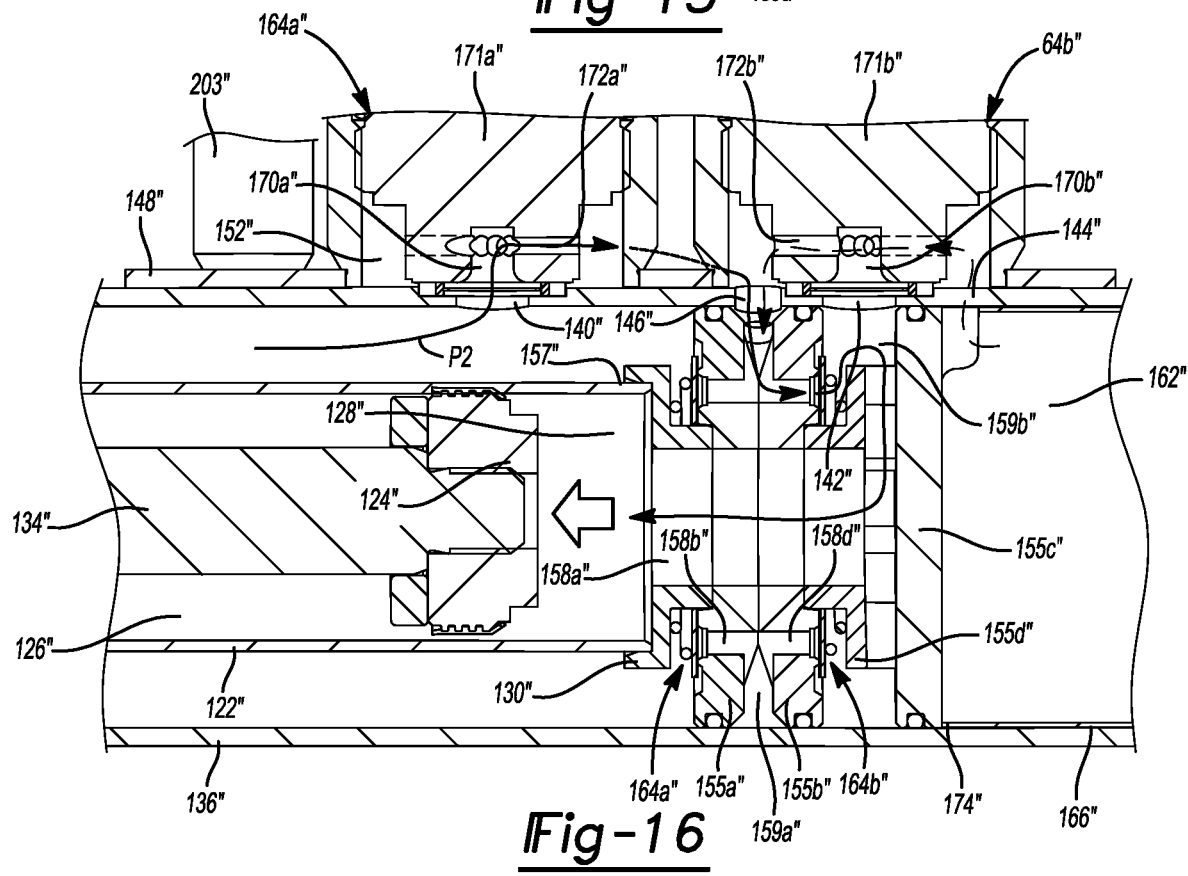
FIG. 16 is another enlarged side cross-sectional view of the exemplary damper shown in FIG. 14, where arrows are included illustrating the fluid flow path through the damper during an extension stroke.

With additional reference to FIGS. 15 and 16, the first control valve 164a" has a first control valve inlet 170a" that is arranged in fluid communication with the fluid transport chamber 138" between the inner and outer tubes 122", 136" and a first control valve outlet 172a" that is arranged in fluid communication with the collector chamber 152". A first control valve port 140" in the outer tube 136" is arranged in fluid communication with and extends between the fluid transport chamber 138" and the first control valve inlet 170a". The second control valve 164b" has a second control valve inlet 170b" that is arranged in fluid communication with the second intermediate chamber 159b" and a second control valve outlet 172b" that is arranged in fluid communication with the collector chamber 152". A second control valve port 142" in the outer tube 136" is arranged in fluid communication with and extends between the second intermediate chamber 159b" and the second control valve inlet 170b". The first control valve 164a" therefore regulates fluid flow from the fluid transport chamber 138" to the collector chamber 152" and the second control valve 164b" regulates fluid flow from the second intermediate chamber 159b" to the collector chamber 152".

One or more accumulator ports 144" in the outer tube 136" are arranged in fluid communication with and extend between the collector chamber 152" and the accumulation chamber 162", while one or more open ports 146" in the outer tube 136" are arranged in fluid communication with and extend between the collector chamber 152" and the first intermediate chamber 159a". In other words, the accumulator chamber 162" is arranged in fluid communication with the collector chamber 152" via the accumulator ports 144" in the outer tube 136" and the first intermediate chamber 159a" is arranged in fluid communication with the collector chamber 152" via the open ports 146" in the outer tube 136". The accumulator ports 144" and open ports 146" in the outer tube 136" are provided in the form of open holes, slots, or apertures that are not open or closed by a valve. As such, fluid may freely flow between the collector chamber 152" and the accumulation chamber 162" and between the collector chamber 152" and the first intermediate chamber 159a".

In the open position, the first control valve 164a" allows fluid communication between the fluid transport chamber 138" and the collector chamber 152". More particularly, the first control valve inlet 170a" is in fluid communication with the fluid transport chamber 138" and the first control valve outlet 172a" is in fluid communication with the collector chamber 152". First valve member 171a allows selective fluid communication between the first control valve inlet 170a" and the first control valve outlet 172a" and therefore selective fluid flow between the fluid transport chamber 138" and the collector chamber 152", which ultimately regulates fluid flow from the first working chamber 126" to the second working chamber 128".

In the open position, the second control valve 164b" allows fluid communication between the second intermediate chamber 159b" and the collector chamber 152". More particularly, the second control valve inlet 170b" is in fluid communication with the second intermediate chamber 159b" and the second control valve outlet 172b" is in fluid communication with the collector chamber 152". Second valve member 171b" allows selective fluid communication between the second control valve inlet 170b" and the second control valve outlet 172b" and therefore selective fluid flow between the second intermediate chamber 159b" and the collector chamber 152", which ultimately regulates fluid flow from the second working chamber 128" to both the fluid transport chamber 138" and the accumulation chamber 162".

As shown in FIG. 15, when the piston 124" moves towards the intake valve assembly 154" during a compression stroke, the volume of the second working chamber 128" decreases. The second control valve 164b" is actuated to the open position during compression strokes of the damper 112" to regulate fluid flow from the second intermediate chamber 159b" to the collector chamber 152". Specifically, the degree of opening of the second control valve 164b" may be regulated to adjust the compression damping characteristics of the damper 112". At the same time, the first control valve 164a" is in the closed position during compression strokes of the damper 112". As a result, there is no communication of fluid directly between the fluid transport chamber 138" and the collector chamber 152" during a compression stroke.

During a compression stroke, a compression flow path P1 is defined inside the damper 112", where fluid in the second working chamber 128" flows through the central passage 158a" in the first intake valve assembly 154" and into the second intermediate chamber 159b". Fluid in the second intermediate chamber 159b" flows to the second control valve inlet 170b" and passes through the second control valve port 142" in the outer tube 136". Fluid from the second control valve inlet 170b" flows to the second control valve outlet 172b" because the second control valve 164b" is in the open position and fluid from the second control valve outlet 172b" flows into the collector chamber 152". The fluid flowing into the collector chamber 152" flows into the accumulation chamber 162" via the accumulation ports 144" in the outer tube 136" and into the first intermediate chamber 159a" via the open ports 146" in the outer tube 136". If the pressure differential between the first intermediate chamber 159a" and the fluid transport chamber 138" exceeds the break pressure of the first intake valve 165a", the first intake valve 165a" will open and fluid will flow through a first set of intake orifices 158b" in the first intake valve body 155a" and into the fluid transport chamber 138". Some of the fluid in the fluid transport chamber 138" then flows through the openings 202" in the first inner tube end 156" and into the first working chamber 126", which increases in volume during compression strokes. Also, as a greater length of the piston rod 134" moves into the first working chamber 126" during a compression stroke, the volume of the fluid that is displaced by the piston rod 134" increases. The fluid that is displaced by the piston rod 134" (i.e., the rod volume) flows into the collector chamber 152", through the accumulator ports 144", and into the accumulation chamber 162", which causes the floating piston 161" to move away from the intake valve assembly 154", increasing the size of the accumulation chamber 162".

As shown in FIG. 16, when the piston 124" moves away from the intake valve assembly 154" during an extension/rebound stroke, the volume of fluid in the second working chamber 128" increases. The first control valve 164a" is actuated to the open position during extension strokes of the damper 112" to regulate fluid flow from the fluid transport chamber 138" to the collector chamber 152". Specifically, the degree of opening of the first control valve 164a" may be regulated to adjust the extension/rebound damping characteristics of the damper 112". At the same time, the second control valve 164b" is in the closed position during extension strokes of the damper 112". As a result, there is no communication of fluid directly between the second intermediate chamber 159b" and the collector chamber 152" during an extension stroke.

During an extension/rebound stroke, a rebound flow path P2 is defined inside the damper 112", where fluid in the first working chamber 126" flows into the fluid transport chamber 138" via the openings 202" in the first inner tube end 156" and the fluid in the fluid transport chamber 138" then flows to the first control valve inlet 170a" and passes through the first control valve port 140" in the outer tube 136". Fluid from the first control valve inlet 170a" flows to the first control valve outlet 172a" because the first control valve 164a" is in the open position and fluid from the first control valve outlet 172a" flows into the collector chamber 152". Fluid from the collector chamber 152" flows into the first intermediate chamber 159a" via the open ports 146" in the outer tube 136". When the pressure differential between the first intermediate chamber 159a" and the second intermediate chamber 159b" exceeds the break pressure of the second intake valve 165b", the second intake valve 165b" will open and fluid in the first intermediate chamber 159a" will flow through a second set of intake orifices 158d" in the second intake valve body 155b", through the second intermediate chamber 159b", through a plurality of channels 204" in the toothed ring 155d", through the central passage 158a" in the first intake valve assembly 154", and into the second working chamber 128". Also, the volume that is displaced by the piston rod 134" (i.e., the rod volume) decreases during an extension/rebound stroke, so an additional flow of fluid must be supplied from the accumulation chamber 163" to compensate for the decrease in the rod volume. Thus, some of the fluid in the accumulation chamber 163" flows through the accumulator ports 144" and into the collector chamber 152" where it joins the extension flow path P2. The net flow of fluid out of the accumulation chamber 162" causes the floating piston 161" to move towards the intake valve assembly 154", decreasing the size of the accumulation chamber 162". Thus, the intake valve assembly 154" allows bi-directional flow of fluid to and from the second working chamber 128".

Figure 18:
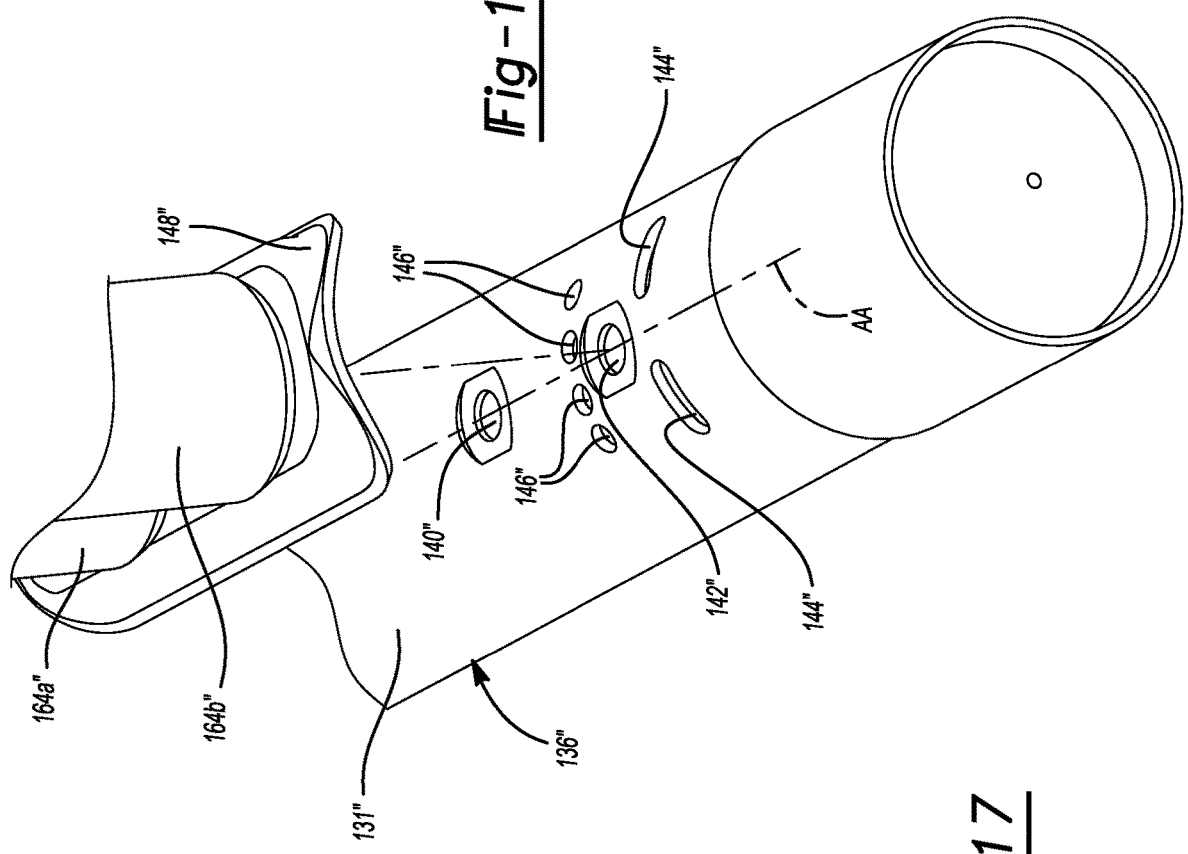
FIG. 18 is an enlarged, exploded perspective view of the exemplary damper shown in FIG. 13 and the externally mounted control valves.
Figure 17:
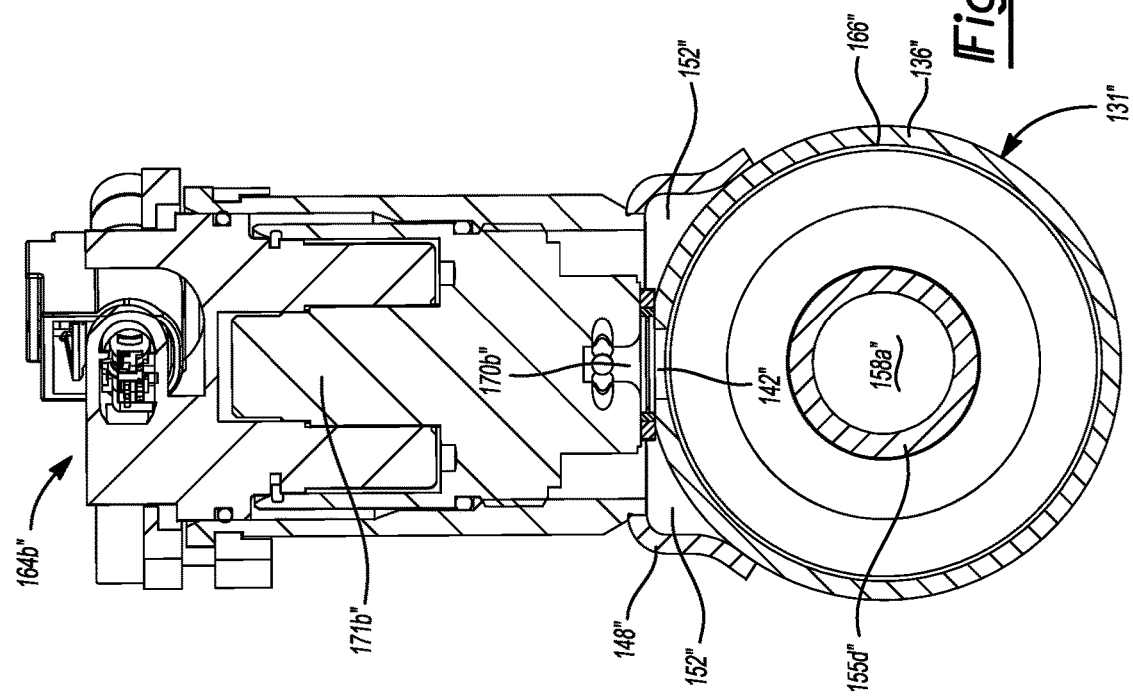
FIG. 17 is a rear cross-sectional view of the exemplary damper shown in FIG. 13 take along line 17-17, which bi-sects one of the two externally mounted control valves of the damper.

With reference to FIGS. 17 and 18, the cross-sectional shape of the collector chamber 152" and the relative alignment of the ports 140", 142", 144", and 146" in the outer tube 136" of the damper 112" is illustrated. The first and second control valves 164a", 164b" are externally mounted on the outer tube 136" in such that the first and second control valve ports 140", 142" are circumferentially aligned with each other on the outer tube 136" along the control valve alignment axis AA. To minimize the overall height of the first and second control valves 164a", 164b", the cover member 148" is externally mounted to the outer tube 136" in such a way that the cover member abuts/contacts the outer cylindrical surface 131" of the outer tube 136" along the control valve alignment axis AA. As such, the collector chamber 152" runs on each side of the control valve alignment axis AA. Due to this height reducing arrangement, both the accumulator ports 144" in the outer tube 136" that lead into the accumulation chamber 162" and the open ports 146" in the outer tube 136" that lead into the first intermediate chamber 159a" are offset relative to the first and second control valve ports 140", 142" such that the accumulator ports 144" and the open ports 146" in the outer tube 136" are circumferentially spaced relative to the control valve alignment axis AA. In other words, the ports 140", 142", 144", and 146" in the outer tube 136" of the damper 112" are arranged such that the control valve alignment axis AA bisects the first and second control valve ports 140", 142", but does not bisect the accumulator ports 144" and the open ports 146" due to their offset arrangement, which places the accumulator ports 144" and the open ports 146" in direct fluid communication with the collector chamber 152".

Figure 21:
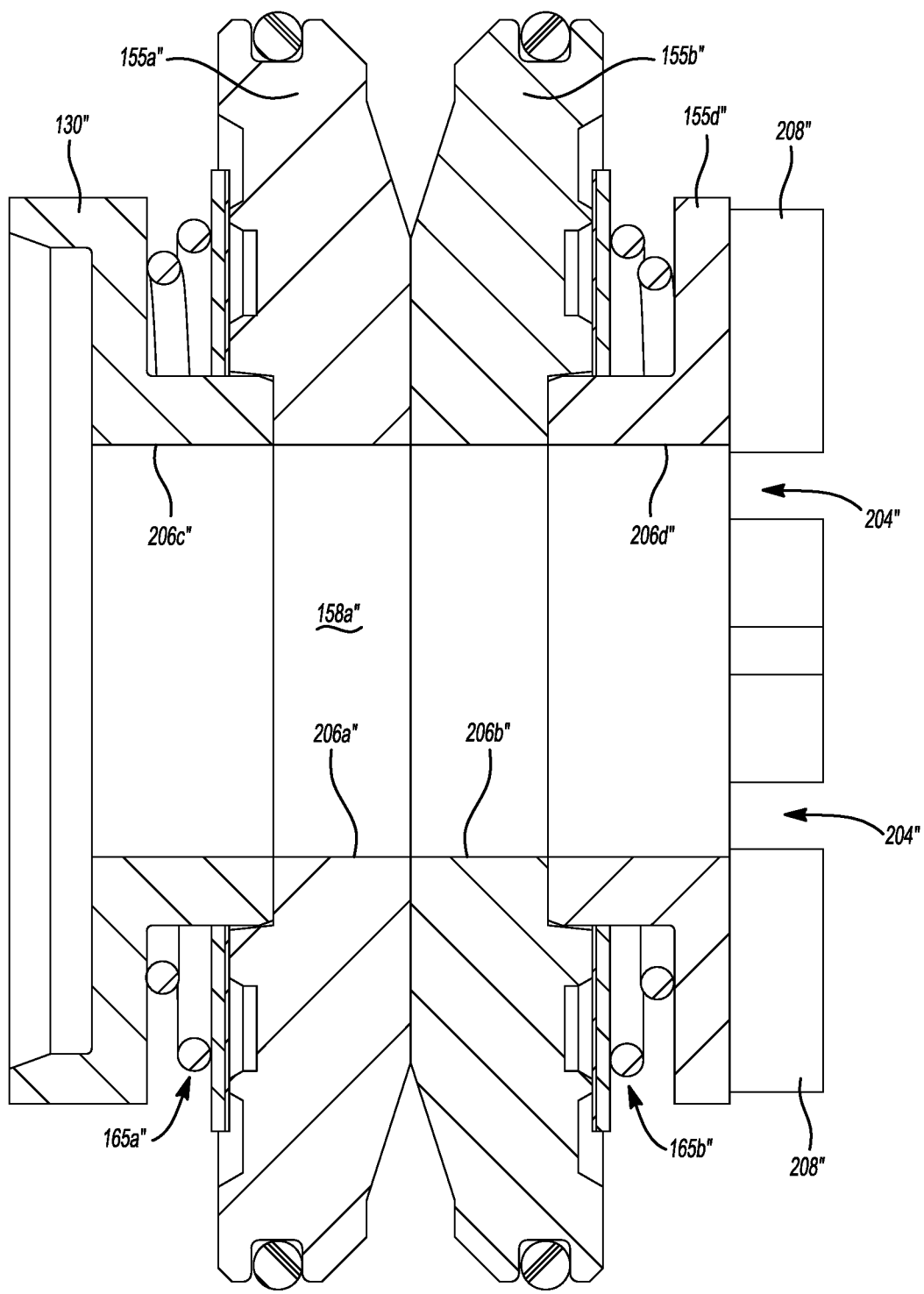
FIG. 21 is an enlarged side cross-sectional view of the exemplary intake valve assembly of the exemplary damper shown in FIG. 13.

With additional reference to FIGS. 19-21, exploded views of the intake valve assembly 154" are shown. The first and second intake valve bodies 155a", 155b" are configured as vented discs, whereas the divider body 155c" is shaped like a solid disk. In this embodiment, there are no orifices or passages in the divider body 155c". As a result, the divider body 155c" acts as a fluid flow obstruction such that there is no fluid flow through the divider body 155c". The first intake valve body 155a" includes a first center bore 206a" that extends through the first intake valve body 155a". The first set of intake orifices 158b" are arranged circumferentially around (i.e., are radially outward of) the first center bore 206a". The second intake valve body 155b" includes a second center bore 206b" that extends through the second intake valve body 155b". The second set of intake orifices 158d" are arranged circumferentially around (i.e., are radially outward of) the second center bore 206b". The adapter ring 130" and the toothed ring 155d" each have a cylindrical hub portion that directly abuts one of the first and second intake valve bodies 155a", 155b" and a disc-like flange portion that retains the first and second intake valves 165a", 165b" such that both the adapter ring 130" and the toothed ring 155d" have shapes similar to that of a top hat. In addition, the adapter ring 130" and the toothed ring 155d" have third and fourth center bores 206c", 206d", respectively. In the embodiment illustrated in FIGS. 13-21, the first center bore 206a" in the first intake valve body 155a", the second center bore 206b" in the second intake valve body 155b", the third center bore 206c" in the adapter ring 130", and the fourth center bore 206d" in the toothed ring 155d" are aligned with one another and co-axially aligned with the central longitudinal axis A of the damper 112" and collectively define the central passage 158a" in the intake valve assembly 154". One advantage of this arrangement is that the adapter ring 130", first and second intake valve bodies 155a", 155b", and the toothed ring 155d" do not need to be indexed or rotated to a particular orientation for the center bores 206a-d" to line up, which is a concern in the embodiment illustrated in FIGS. 8-12, where the first and second intake valve bodies 155a', 155b' must be properly indexed (i.e., rotated) to allow for the alignment of the central passages 158a', 158c'.

It should be appreciated that the first intake valve 165a" controls fluid flow through the first set of intake orifices 158b" between the first intermediate chamber 159a" and the fluid transport chamber 138". In the illustrated example, the first intake valve 165a" is a passive valve. More specifically, in the illustrated embodiment, the first intake valve 165a" includes a first spring disc stack 167a" that is retained between the adapter ring 130" and the first intake valve body 155a". In operation, the first spring disc stack 167a" opens and closes the first intake orifices 158b" by flexing towards and away from the first intake valve body 155a" based on a pressure differential between the first intermediate chamber 159a" and the fluid transport chamber 138". As a result, the first intake valve 165a" acts as a one-way valve that permits fluid flow in only one direction from the first intermediate chamber 159a" to the fluid transport chamber 138". As explained above, this one-way flow through the first intake valve 165a" occurs during compression strokes as the piston 124" moves toward the intake valve assembly 154".

The second intake valve 165b" controls fluid flow through the second set of intake orifices 158d" between the first and second intermediate chambers 159a", 159b". In the illustrated example, the second intake valve 165b" is a passive valve. More specifically, in the illustrated embodiment, the second intake valve 165b" includes a second spring disc stack 167b" that is retained between the second intake valve body 155b" and the toothed ring 155d". In operation, the second spring disc stack 167b" opens and closes the second intake orifices 158d" by flexing towards and away from the second intake valve body 155b" based on a pressure differential between the first intermediate chamber 159a" and the second intermediate chamber 159b". The second intake valve 165b" acts as a one-way valve that permits fluid flow in only one direction from the first intermediate chamber 159a" and the second intermediate chamber 159b". As explained above, this one-way flow through the second intake valve 165*b*" occurs during extension strokes as the piston 124" moves away from the intake valve assembly 154".

The toothed ring 155*d*" includes a plurality of teeth 208" that are arranged to abut the divider body 155*c*". The plurality of teeth 208" are circumferentially spaced to define the plurality of channels 204" in the toothed ring 155*d*". The plurality of channels 204" in the toothed ring 155*d*" extend radially outwardly away from the central longitudinal axis A and therefore permit fluid flow between the second intermediate chamber 159*b*" and the central passage 158*a*".

Figure 22:
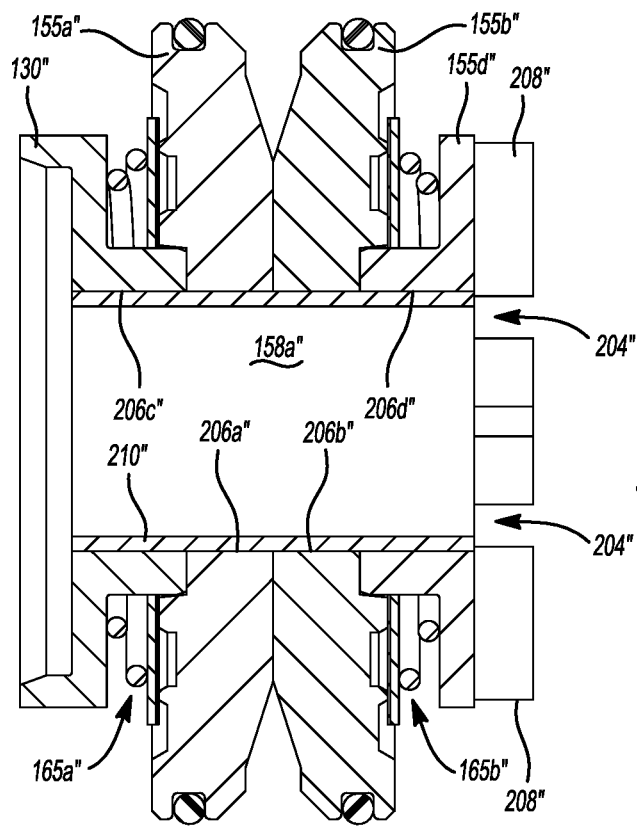
FIG. 22 is an enlarged side cross-sectional view of another exemplary intake valve assembly that is shown as a pre-assembled sub-assembly that is press-fit on a retainer sleeve.
Figure 23:
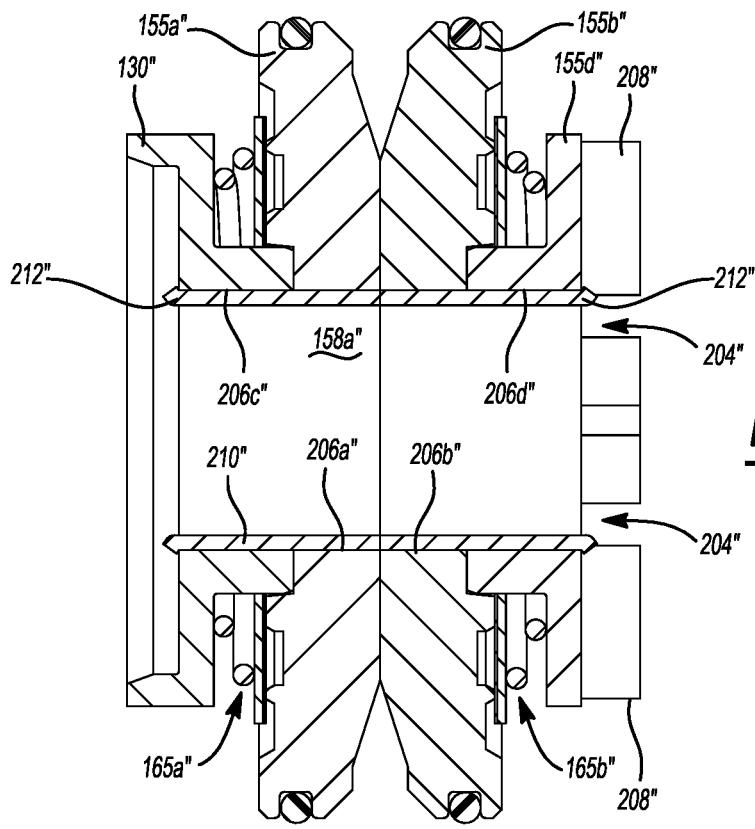
FIG. 23 an enlarged side cross-sectional view of another exemplary intake valve assembly that is shown as a pre-assembled sub-assembly that is mounted on another retainer sleeve with mechanically deformed ends.

As shown in FIGS. 22 and 23, the adapter ring 130", the first and second intake valve bodies 155*a*", 155*b*", and the toothed ring 155*d*" can be pre-assembled onto a retainer sleeve 210" prior to insertion into the outer tube 136" of the damper 112". As shown in FIG. 22, the retainer sleeve 210" is press-fit into the center bores 206*a-d*" of the adapter ring 130", the first and second intake valve bodies 155*a*", 155*b*", and the toothed ring 155*d*" such that the pre-load on the first and second spring disc stacks 167*a*", 167*b*" does not drive the components of the pre-assembly apart. Alternatively, the retainer sleeve 210" may be inserted into the center bores 206*a-d*" of the adapter ring 130", the first and second intake valve bodies 155*a*", 155*b*", and the toothed ring 155*d*" and then hammered or otherwise manipulated to produce outwardly, flared, mechanically deformed ends 212" illustrated in FIG. 23, which function to hold the components of the pre-assembly together before the pre-assembly is inserted into the outer tube 136" of the damper 112". In accordance with this embodiment, manufacturing and assembly of the damper 112" is less complicated, more efficient, and more economical. Both the intake valve assembly 154" and the accumulator insert 160" can be pre-assembled prior to installation inside the outer tube 136".

For example, an exemplary method of manufacturing the damper 112 is set forth below. The method includes the steps of inserting an accumulator insert 160" and then inserting an intake valve assembly 154" into the first outer tube end 137". The intake valve assembly 154" is designed to be inserted in a sequentially ordered stack comprised of a toothed ring 155*d*", a second spring-disc stack 167*b*", a second intake valve body 155*b*", a first intake valve body 155*a*", a first spring-disc stack 167*a*", and an adapter ring 130", in that order. In other words, the toothed ring 155*d*" is the first component of the intake valve assembly 154" that is inserted into the first outer tube end 137" and the adapter ring 155*d*" is the last component of the intake valve assembly 154" that is inserted into the first outer tube end 137". The method continues with the step of inserting the inner tube 122" into the first outer tube end 137" and pressing the second inner tube end 157" into contact with the adapter ring 130" of the intake valve assembly 154" such that the intake valve assembly 154" is clamped between the accumulator insert 160" and the second inner tube end 157". As explained above, the method may also include creating a pre-assembled intake valve assembly 154" by fitting the toothed ring 155*d*", the second spring-disc stack 167*b*", the second intake valve body 155*b*", the first intake valve body 155*a*", the first spring-disc stack 167*a*", and the adapter ring 130" onto a retainer sleeve 210" before inserting the intake valve assembly 154" into the first outer tube end 137" to improve the ease of assembly. In addition, all of these steps can be done without any welding operations.

While aspects of the present disclosure have been particularly shown and described with reference to the embodiments above, it will be understood by those skilled in the art that various additional embodiments may be contemplated by the modification of the disclosed dampers without departing from the spirit and scope of what is disclosed. Such embodiments should be understood to fall within the scope of the present disclosure as determined based upon the claims and any equivalents thereof.

What is claimed is:

1. A damper comprising:
an inner tube extending longitudinally between a first inner tube end and a second inner tube end;
a piston slidably disposed within the inner tube defining a first working chamber and a second working chamber;
an outer tube disposed around the inner tube, the outer tube extending longitudinally between a first outer tube end and a second outer tube end, the first working chamber arranged in fluid communication with a fluid transport chamber disposed between the inner tube and the outer tube;
a collector chamber positioned outside of the outer tube; and
an intake valve assembly positioned within the outer tube to define an accumulation chamber arranged in fluid communication with the collector chamber, the intake valve assembly including a first intermediate chamber disposed in uninterrupted fluid communication with the collector chamber and the accumulation chamber, and a second intermediate chamber disposed in fluid communication with the second working chamber,
wherein the intake valve assembly includes a central passage that extends longitudinally through the intake valve assembly and that is arranged in fluid communication with the second intermediate chamber and the second working chamber,
wherein the intake valve assembly includes at least one intake valve that controls fluid flow through the intake valve assembly.

2. The damper of claim 1, wherein the intake valve assembly includes a first intake valve that controls fluid flow between the first intermediate chamber and the fluid transport chamber and a second intake valve that controls fluid flow between the first and second intermediate chambers.

3. The damper of claim 2, wherein the intake valve assembly includes a first intake valve body adjacent the second inner tube end, a divider body that is longitudinally spaced from the first intake valve body, and a second intake valve body that is positioned longitudinally between the first intake valve body and the divider body, wherein the first intake valve is mounted to the first intake valve body and is configured to open and close a first intake orifice in the first intake valve body, wherein the second intake valve is mounted to the second intake valve body and is configured to open and close a second intake orifice in the second intake valve body, and wherein the first and second intake valve bodies and the divider body abut an inside cylindrical surface of the outer tube.

4. The damper of claim 3, wherein the first intermediate chamber is defined between the first intake valve body and the second intake valve body and the second intermediate chamber is defined between the second intake valve body and the divider body.

5. The damper of claim 4, wherein the first intake valve is a passive, one-way valve that permits fluid flow through the first intake orifice in only one direction from the first intermediate chamber to the fluid transport chamber and the second intake valve is a passive, one-way valve that permits fluid flow through the second intake orifice in only one direction from the first intermediate chamber to the second intermediate chamber.

6. The damper of claim 5, wherein the intake valve assembly includes an adapter ring and a toothed ring, the adapter ring is positioned longitudinally between the second inner tube end and the first intake valve body in an abutting arrangement, the toothed ring is positioned longitudinally between the second intake valve body and the divider body in an abutting arrangement, the first intake valve is a spring-disc stack that is positioned longitudinally between and retained by the adapted ring and the first intake valve body, and the second intake valve is a spring-disc stack that is positioned longitudinally between and retained by the second intake valve body and the toothed ring.

7. The damper of claim 6, wherein the toothed ring includes a plurality of teeth that abut the divider body and that are circumferentially spaced to define a plurality of radially extending channels in the toothed ring that permit fluid flow between the second intermediate chamber and the central passage.

8. The damper of claim 7, wherein the first and second intake valve bodies, the adapter ring, and the toothed ring include center bores that are aligned with a central longitudinal axis of the damper and that collectively form the central passage of the intake valve assembly.

9. The damper of claim 8, wherein the intake valve assembly includes a retainer sleeve that extends through the center bores of the first and second intake valve bodies, the adapter ring, and the toothed ring to hold the intake valve assembly together as a sub-assembly before and after installation into the outer tube.

10. The damper of claim 3, wherein the first intake valve body includes first passages that extend through the first intake valve body and the second intake valve body includes second passages that extend through the second intake valve body and that are arranged in fluid communication with the first passages such that the first and second passages in the first and second intake valve bodies collectively form the central passage of the intake valve assembly.

11. The damper of claim 3, further comprising:
an accumulator insert comprising an accumulator sleeve positioned inside the outer tube, a floating piston slidably disposed in the accumulator sleeve, and a pressurized chamber positioned longitudinally between the floating piston and the second outer tube end, the pressurized chamber containing a pressurized fluid that operates to bias the floating piston towards the intake valve assembly,
wherein the accumulation chamber is defined between the intake valve assembly and the floating piston,
wherein the accumulation chamber is arranged in fluid communication with the collector chamber via at least one accumulator port in the outer tube,
wherein the divider body is a fluid flow barrier that is free of orifices or passages such that there is no fluid flow through the divider body,
wherein the divider body is positioned between the accumulator sleeve and the second intermediate chamber such that the intake valve assembly is clamped between the accumulator sleeve and the second inner tube end.

12. The damper of claim 1, further comprising:
a first control valve externally mounted to the outer tube, the first control valve having a first control valve inlet that is arranged in fluid communication with the fluid transport chamber and a first control valve outlet that is arranged in fluid communication with the collector chamber; and
a second control valve externally mounted to the outer tube, the second control valve having a second control valve inlet that is arranged in fluid communication with a second intermediate chamber that is arranged in fluid communication with the central passage and a second control valve outlet that is arranged in fluid communication with the collector chamber.

13. A damper comprising:
an inner tube extending longitudinally between a first inner tube end and a second inner tube end;
a piston slidably disposed within the inner tube defining a first working chamber and a second working chamber;
an outer tube disposed around the inner tube, the outer tube extending longitudinally between a first outer tube end and a second outer tube end, the first working chamber arranged in fluid communication with a fluid transport chamber disposed between the inner tube and the outer tube;
a cover member mounted to the outer tube to define a collector chamber that is positioned outside of the outer tube;
an intake valve assembly positioned within the outer tube and including at least one intermediate chamber disposed in fluid communication with the collector chamber via one or more open ports in the outer tube and at least one intake valve that controls fluid flow between the at least one intermediate chamber and the fluid transport chamber;
a first control valve externally mounted to the cover member on the outer tube, the first control valve having a first control valve inlet that is arranged in fluid communication with the fluid transport chamber via a first control valve port in the outer tube and a first control valve outlet that is arranged in fluid communication with the collector chamber; and
a second control valve externally mounted to the cover member on the outer tube, the second control valve having a second control valve inlet that is arranged in fluid communication with the at least one intermediate chamber via a second control valve port in the outer tube and a second control valve outlet that is arranged in fluid communication with the collector chamber.

14. The damper of claim 13, wherein the first and second control valve ports are circumferentially aligned with each other on the outer tube along a control valve alignment axis that runs parallel with a central longitudinal axis of the damper.

15. The damper of claim 14, wherein the cover member abuts the outer tube along the control valve alignment axis such that the collector chamber runs on each side of the control valve alignment axis.

16. The damper of claim 15, wherein the intake valve assembly includes a first intake valve body adjacent the second inner tube end, a divider body that is longitudinally spaced from the first intake valve body, and a second intake valve body that is positioned longitudinally between the first intake valve body and the divider body, and wherein the first and second intake valve bodies and the divider body abut an inside cylindrical surface of the outer tube such that a first intermediate chamber is defined between the first intake valve body and the second intake valve body and a second intermediate chamber is defined between the second intake valve body and the divider body.

17. The damper of claim 16, wherein the second control valve inlet is arranged in fluid communication with the second intermediate chamber via the second control valve port in the outer tube, the one or more open ports in the outer tube are arranged in alignment with the first intermediate chamber and the collector chamber to permit fluid flow between the first intermediate chamber and the collector chamber, and the one or more open ports in the outer tube being offset relative to the first and second control valve ports such that the one or more open ports are circumferentially spaced relative to the control valve alignment axis.

18. The damper of claim 14, further comprising:
an accumulator positioned inside the outer tube, a floating piston slidably disposed in the accumulator, and a pressurized chamber positioned longitudinally between the floating piston and the second outer tube end, the pressurized chamber containing a pressurized fluid that operates to bias the floating piston towards the intake valve assembly such that an accumulation chamber is defined between the intake valve assembly and the floating piston,
wherein the accumulation chamber is arranged in fluid communication with the collector chamber via one or more accumulator ports in the outer tube,
wherein the one or more accumulator ports in the outer tube are offset relative to the first and second control valve ports such that the one or more accumulator ports are circumferentially spaced relative to the control valve alignment axis.

19. A method of manufacturing a damper, the method comprising the steps of:
forming an outer tube with a first outer tube end that is open and a second outer tube end that has a closed portion, the outer tube including a port extending therethrough;
forming an inner tube with a first inner tube end and a second inner tube end;
inserting an accumulator insert into the first outer tube end;
inserting an intake valve assembly into the first outer tube end, the intake valve assembly being inserted in a sequentially ordered stack comprised of a toothed ring, a second spring-disc stack, a second intake valve body, a first intake valve body, a first spring-disc stack, and an adapter ring where the toothed ring is the first component of the intake valve assembly to be inserted into the first outer tube end and the adapter ring is the last component of the intake valve assembly to be inserted into the first outer tube end;
defining an intermediate chamber between the first intake valve body and the second intake valve body within the outer tube and positioning the intermediate chamber in fluid communication with the port; and
inserting the inner tube into the first outer tube end and pressing the second inner tube end into contact with the adapter ring of the intake valve assembly such that the intake valve assembly is clamped between the accumulator insert and the second inner tube end.

20. The method of claim 19, further comprising the steps of:
creating a pre-assembled intake valve assembly by fitting the toothed ring, the second spring-disc stack, the second intake valve body, the first intake valve body, the first spring-disc stack, and the adapter ring onto a retainer sleeve before inserting the intake valve assembly into the first outer tube end.

21. A damper comprising:
an inner tube extending longitudinally between a first inner tube end and a second inner tube end;
a piston slidably disposed within the inner tube defining a first working chamber and a second working chamber;
an outer tube disposed around the inner tube, the outer tube extending longitudinally between a first outer tube end and a second outer tube end, the first working chamber arranged in fluid communication with a fluid transport chamber disposed between the inner tube and the outer tube;
a collector chamber positioned outside of the outer tube; and
an intake valve assembly positioned within the outer tube to define an accumulation chamber arranged in fluid communication with the collector chamber, the intake valve assembly including a first intermediate chamber disposed in uninterrupted fluid communication with the collector chamber and the accumulation chamber, and a second intermediate chamber disposed in fluid communication with the second working chamber,
wherein the intake valve assembly includes a central passage that extends longitudinally through the intake valve assembly and that is arranged in fluid communication with the second intermediate chamber and the second working chamber,
wherein the intake valve assembly includes at least one intake valve that controls fluid flow through the intake valve assembly, wherein the intake valve assembly includes a first intake valve that controls fluid flow between the first intermediate chamber and the fluid transport chamber and a second intake valve that controls fluid flow between the first and second intermediate chambers, wherein the intake valve assembly includes a first intake valve body adjacent the second inner tube end, a divider body that is longitudinally spaced from the first intake valve body, and a second intake valve body that is positioned longitudinally between the first intake valve body and the divider body, wherein the first intake valve is mounted to the first intake valve body and is configured to open and close a first intake orifice in the first intake valve body, wherein the second intake valve is mounted to the second intake valve body and is configured to open and close a second intake orifice in the second intake valve body, and wherein the first and second intake valve bodies and the divider body abut an inside cylindrical surface of the outer tube.

* * * * *